United States Patent [19]
Courts et al.

[11] Patent Number: 5,394,537
[45] Date of Patent: Feb. 28, 1995

[54] ADAPTIVE PAGE PLACEMENT MEMORY MANAGEMENT SYSTEM

[75] Inventors: Howard R. Courts; Donald W. Oxley, both of Austin, Tex.

[73] Assignee: Texas Instruments Incorporated, Dallas, Tex.

[21] Appl. No.: 131,107

[22] Filed: Oct. 1, 1993

Related U.S. Application Data

[63] Continuation of Ser. No. 988,396, Dec. 9, 1992, abandoned, which is a continuation of Ser. No. 450,201, Dec. 13, 1989, abandoned.

[51] Int. Cl.[6] .............................................. G06F 12/02
[52] U.S. Cl. ........................... 395/425; 364/DIG. 1; 364/254.3; 364/246.13
[58] Field of Search ... 364/200 MS File, 900 MS File; 395/400, 425

[56] References Cited

U.S. PATENT DOCUMENTS

| | | | |
|---|---|---|---|
| 4,463,424 | 7/1984 | Mattson et al. | 395/425 |
| 4,467,421 | 8/1984 | White | 364/200 |
| 4,530,054 | 7/1985 | Hamstra et al. | 395/550 |
| 4,636,946 | 1/1987 | Hartung | 395/425 |
| 4,825,412 | 4/1989 | Sager et al. | 365/49 |
| 4,897,783 | 1/1990 | Nay | 395/425 |
| 4,967,353 | 10/1990 | Brenner et al. | 395/425 |
| 5,043,885 | 8/1991 | Robinson | 395/425 |
| 5,109,496 | 4/1992 | Beausoleil et al. | 395/400 |
| 5,146,604 | 9/1992 | Takada | 395/425 |
| 5,159,677 | 10/1992 | Rubsam et al. | 395/425 |

OTHER PUBLICATIONS

Williams et al, Dynamic Grouping in an Object Oriented Virtual Memory Hierarchy, Proc. ECOOP (1987), p. 87.

Baier et al, Dynamic Improvement of Locality in Virtual Memory Systems, 2(1) IEEE Trans. Software Engineering 54(1976).

Primary Examiner—Joseph L. Dixon
Assistant Examiner—Hiep T. Nguyen
Attorney, Agent, or Firm—Ronald O. Neerings; James C. Kesterson; Richard L. Donaldson

[57] ABSTRACT

A virtual memory system groups pages into clusters according to use, determined by first reference and frequency of reference. The virtual memory system comprises a random access memory and an auxiliary memory. A central processing unit the virtual memory system with an address. Whenever that address identifies a memory location not stored in the RAM, the entire cluster of pages in which the address is located is retrieved from the auxiliary memory into the random access memory.

7 Claims, 7 Drawing Sheets

ADAPTIVE PAGE PLACEMENT MEMORY MANAGEMENT SYSTEM

This application is a continuation of application Ser. No. 07/988,396, filed Dec. 9, 1992, abandoned which is a continuation of application Ser. No. 07/450,201, filed Dec. 13, 1989, now abandoned.

BACKGROUND AND SUMMARY OF THE INVENTION

This invention relates generally to computer systems and more specifically to memory management systems.
Memory Organization Computer system memory is generally divided into two levels: RAM based main memory and auxiliary memory, which is stored on a data storage medium, typically a hard disk or drum. For clarity, the term disk will be used throughout this discussion when referring to an auxiliary memory storage device, although the discussion is valid to other auxiliary memory storage devices.

The basic unit of data is the bit (for Binary digit). Groups of bits are organized into units known as bytes. A byte is generally eight bits long, although other lengths are possible. Bytes can be further organized into groups known as words, or into groups known as objects. Words are generally four, eight, or sixteen bytes in length, although other lengths are not uncommon. Objects may have no set length and may vary in length, even within a given system.

Memory, whether on disk or in RAM, is generally divided into smaller regions known as blocks, for ease of organizing and manipulating the data. When the blocks are all of the same size, they are called pages. Therefore, computer system memory is generally divided into a plurality of pages in each of which are found a plurality of words or objects. The words or objects themselves each consist of a plurality of bytes.

The terminology used to describe computer system memory suggest the obvious analogy. One can think of the system memory as a book in which are found pages upon which are found words. With a large book, a single, small word would be very difficult to locate. However, by organizing the words into pages, and referencing a word by the page in which it is contained, the word can be located with relative ease.

Although it is convenient to think of memory organization in terms of the book analogy, computer memory is quite distinct from printed information. Like a book, memory can be read from, however; memory can also be updated and written to. Furthermore, memory is dynamic—the data it contains can be moved from one location to another.

The procedure of organizing how data is distributed and moved between the main and auxiliary levels of memory is called memory management, the goal of which is to provide the greatest system speed and efficiency by maintaining in main memory that data which is most likely to be referenced by the processor. Memory management can be broken down into three procedures.

1. Page Fault: This procedure determines when a block of data needs to be moved from auxiliary memory (disk) to main memory (RAM).

2. Placement: This procedure locates unallocated regions of main memory into which the incoming data will be placed.

3. Preempt: This procedure determines which blocks will be removed from main memory and relocated to auxiliary memory, in order to free up main memory space for more incoming data.

Originally these tasks were left to the programmer, who had to keep track of what blocks of auxiliary memory would be required by the processor at what times, and issue move commands to transfer the blocks to main memory RAM at the appropriate point of the program. Needless to say, this was a complicated and tedious task, which consumed as much as forty percent of programming costs for complicated programs.
Virtual Memory Systems With the advent of virtual memory systems, the burden of memory management was removed from the programmer, and placed within the operating system of the computer. A virtual memory system can be best described in terms of three concepts, which are a virtual address space, a physical address space, and a translation function. The virtual address space is that set of addresses which the processor can generate. The physical address is the physical location of the memory address, whether in RAM or on disk. The translation function translates the virtual address generated by the processor to its physical location in memory, as well as translating the physical address to its associated virtual address.

FIG. 1 is a simplified block diagram of a virtual memory system. When a virtual address is issued from the processor 1, it is acted upon by the translator function of the virtual memory system 2. Two scenarios are possible when the translation function acts upon a virtual address. If the translation results in a physical address in RAM 3, the address is passed on to RAM and processing continues. If the translation results in a physical address in auxiliary memory 4, the virtual memory controller 5 issues the appropriate commands to transfer the block of memory containing this physical address to some unallocated portion of RAM 3, where it will be referenced by the processor. This entire process is 'transparent' to the address generating processor. In this way, the processor can reference a very large virtual memory, 'unaware' that it is in fact, being served by a relatively small RAM in which the information stored therein is constantly being changed to meet the demands of the processor. This is accomplished by the Page Fault, Placement and Preempt procedures.
Page Fault When the translation from the virtual address generated by the processor to the physical address results in a physical location on disk, a page fault is generated. The purpose of the page fault is to load the desired data to RAM so that it can be referenced by the processor and processing can continue. Normally, the minimum quantum of data transfer is a page. Therefore, when it is desired to load the contents of a given physical address to RAM, the entire page in which the address is located will be loaded, hence the term page fault.

The time required to physically locate the page in the auxiliary memory and to transfer it to RAM is called paging time. Paging time involves several factors. These factors are the time to position the read/write heads to the appropriate area of the disk called the access delay; the time to rotate the disk to the appropriate sector wherein the data is contained, called the rotational delay; and the time to actually transfer the data to RAM, called the transfer time. As processing is halted until the data is transferred into RAM, paging time can be a serious bottleneck in system performance.

Prepaging is a common attempt at easing the problem of paging time. In a prepaging scheme, one or more pages located adjacent the faulted page are loaded to RAM, along with the faulted page, during the page fault. Since a major portion of paging time is due to access delay and rotational delay, several adjacent pages can be transferred along with the faulted page without significantly affecting the overall paging time. For instance, in a typical hard disk system, access delay may be sixteen ms, rotational delay, eight ms, and the transfer delay equal to one ms per K-byte (K=1024). Therefore, for a typical page size of two K-bytes, the total paging time would be twenty-six ms. If in the same system, four pages were prepaged along with the faulted page, the total paging time would be thirty-four ms. In this case five times as many pages were loaded into RAM with only a thirty percent increase in paging time.

In order for prepaging to be effective, there must be some probability that some of the adjacent pages loaded into RAM will be also be referenced by the processor. The only relationship the prepaged pages have to the faulted page is their location on the physical address space. Statistically, however, some fraction of the pages will be referenced by the processor within a reasonable time of the page fault. Since these pages have already been loaded into RAM, an additional paging time delay is not encountered when the prepaged pages are referenced.

It is important to note that the pages were located in a contiguous region on the physical address space (the disk), and that they were loaded onto a contiguous region of the virtual address space (in RAM). Therefore, the spatial relationship of these pages in both address spaces (called the spatial locality of reference) is fixed and unchanging. In a conventional virtual memory system, contiguous regions of the physical address space are always mapped to contiguous regions of the virtual address space. Also of note is the fact that the page faulted from disk, and the pages prepaged with it, now have two locations. The pages retain their original location on the disk, as well as the new locations on RAM. At some future point when the pages are preempted back to disk, they will be transferred to the same physical location.

Preempt

Pages in RAM which are being referenced by the processor are said to be active. When a page has been faulted into RAM, it is as a result of a reference by the processor. Naturally such a page will be active. However, some, or perhaps all of the pages prepaged into RAM will not be referenced by the processor at all. These inactive pages occupy valuable RAM space which could be used by other pages. Additionally, eventually processing will progress to some point, or move on to some new task, where the active page will no longer continue to be referenced by the processor, and will hence become inactive.

Preemption is the process whereby inactive pages are removed from RAM and transferred back to disk in order to make room in RAM for new incoming active pages. The first step is to select which pages currently in RAM should be preempted and transferred to disk. The second step is to actually transfer the pages to disk.

A common technique to select pages for preemption is to use a clock algorithm which sequentially polls each page in RAM, and a reference bit associated with each page, in a circular fashion, just as the hands of a clock rotate around the circular time marks. The reference bit is set when the page is referenced by the processor. As the clock algorithm progresses, it checks the reference bit of each page it polls to see if the bit has been set. If the bit is set, this indicates the page has been referenced by processor since the last time it was polled. The clock algorithm clears the bit and continues. If the bit is clear this indicates that the page has not been referenced since the last rotation of the clock algorithm. The clear reference bit indicates that this page is inactive. The page can then be selected for preemption, thus meeting the goal of selecting those pages which are no longer active.

There are several variations of this algorithm known. In one instance there is a counter associated with each page, as well as the reference bit. In this scheme, when the reference bit is cleared, the counter is set to some initial value N. Each time the page is polled by the clock algorithm, the counter value is decremented by one (providing the reference bit remains clear). The page is not selected for preemption until the reference bit is clear and the counter value is zero. If at any point, the page is referenced again before it is preempted, the reference bit it set, and the counter is reset to the initial value N. In this way, a page will reside in RAM for $N+1$ rotations of the clock algorithm without being referenced by the processor before being selected for preemption.

After a page has been selected for preemption, the contents of the page must be transferred back to the disk. Recall, however, that the page has two locations, one in RAM, and one in disk. Therefore, it may not be necessary to actually transfer the data back to disk, but simply to change the translation function for that page such that the disk address corresponds to the page's virtual address. If however, the data within the page has been modified or updated in any way, the data must be transferred to disk, in order to store the modifications. This necessitates the need for a modified bit. The modified bit is set if the data within a page has been changed. When a page has been selected for preemption, the modified bit is checked. If the bit is clear, then the virtual memory system can simply update the page's physical address index to point to the disk address. If, however, the modified bit is set, then the page must be transferred to the auxiliary memory to retain the modifications. After the page has been transferred to auxiliary memory, if necessary, and its address has been updated the page of RAM it occupied is released to a free page pool which is used to satisfy the storage requirements of incoming pages of data.

In the preemption procedure, just as in the page fault procedure, a contiguous region of virtual address space is mapped to a contiguous region of the physical address space on the disk. This is a static process, which makes no adjustment for patterns of access or usage of the pages.

To illustrate, consider the region of memory illustrated in the FIG. 2a. In the case of a system which prepages two additional pages with each page faulted in, the page located at physical address P100 is referenced by the processor. The conventional memory system faults in page P100, i.e. it transfers it to virtual memory, to address V100. Additionally, the system will transfer pages P99 and P101 by virtue of their location in reference to P100. Note that the contiguously located pages on the physical address space are transferred to contiguously located pages on the virtual address space. Page V100 is referenced by the processor for a given period of time, whereas in this instance, pages V99 and V101 are not referenced at all. For this circumstance, the prepaging scheme did not improve system performance at all because the additional pages were not referenced. At other times, however, V99, or V101, or both may be referenced, thus driving the motivation for prepaging.

Eventually, V100 will no longer be referenced by the processor, its reference bit will be cleared by the clock algorithm, and it will be selected for preemption. Pages V99 and V101, which, in this case, were never referenced by the processor, also have clear reference bits, and may also be selected for preemption. When selected for preemption, the contiguously located virtual pages V99, V100, and V101 will be transferred back to contiguously located physical pages P99, P100, and P101. This is a static process because the relationship between pages, whether on the virtual address space or on the physical address space, is unchanging.

The shortcoming of the above described conventional systems is that they do not a take advantage of a characteristic of data usage in a system. In a typical application, certain areas of memory will be frequently referenced by the processor, at certain periods of time. These areas of memory are considered dynamically active. Additionally, there are patterns in memory activity. In other words, if during a period of time, Page X is dynamically active, and Pages Y and Z are also dynamically active, it is probable that the next time Page X is active, Pages Y and Z will also again be dynamically active. A further characteristic of memory usage is that these dynamically active pages are randomly scattered throughout the virtual address space. Refer again to FIG. 2a, in the case where the pages V100, V200, and V300 are dynamically active. First note that since pages P100, P200, and P300 are not contiguous on the physical address space, the three pages must have been loaded into RAM in three separate page faults (along with the two adjacent pages for each). Further note, that as explained above, it is highly probable that at some future time, when V100 is again dynamically active, V200 and V300 will again be dynamically active. However, with conventional memory systems, V100 will be mapped back to P100, V200 will be mapped back to P200, and V300 will be mapped back to P300 in separate preemption routines, after they have become inactive. Furthermore, if in some future point in time, the three pages again become dynamically active simultaneously (as is probable due to typical memory usage patterns) the pages will again be faulted into RAM in three separate page faults. Obviously, this static, non-adaptive approach to memory management causes a great deal of inherent inefficiency within the system.

FIG. 3 is a memory reference trace pattern of a typical application. The horizontal axis represents the virtual address space, and time progresses as one moves down the vertical axis. Each pixel represents 1 KB of virtual address space which is marked if there was any reference in the 1 KB range covered and clear if there was no reference in the 1 KB range covered. The dynamically active addresses are referred to as 'hot spots.' For any given duration of time one can define a working set as that group of addresses that are dynamically active. Naturally, the size of a working set depends of the duration of time chosen—with the working set growing larger as the time duration increases.

To aid the understanding of the data in FIG. 3 we can identify three different classes of locality of reference.

First there is spatial locality of reference. This form of locality says that if a given virtual address is referenced then it is very likely that an address close to the previous address will be referenced. This is the only form of locality which can be leveraged with prepaging in a conventional paging system. In FIG. 3 high spatial locality will result in horizontal lines indicating that closely space virtual addresses have been referenced in a short period of time. Examination of FIG. 3 does not show a pattern of horizontal lines so there is not much spatial locality of reference and conventional prepaging will not yield much gain.

Second there is temporal locality of reference. Temporal locality says that if a given address is referenced then it is very likely that the same address will be referenced in the future. In FIG. 3 temporal locality of reference will result in vertical lines. Examination of FIG. 3 does show a number of vertical lines indicating a great deal of temporal locality of reference. Temporal locality of reference is the foundation for all forms of caching including the caching implied in any demand page virtual memory system.

Third there is structural locality of reference. Structural locality of reference says that if a set of addresses is referenced in a short time period and one element of the set is referenced in the future then it is very likely that other members of the set will also be referenced in a short time period in the future. In FIG. 3 the presence of structural locality of reference is indicated by patterns which repeat from time to time. Examination of FIG. 3 shows a substantial amount of structural locality. Notice the reference pattern circled at times A, B, and C in FIG. 3. The dynamically active addresses, or hot spots, in each pattern are not localized to an area of the address space, but are spread out across much of the address space. However, it is clear that the access pattern at time A is highly correlated with the access pattern at times B and C. Most of the hot spots in pattern A are repeated in pattern set B. Patterns B and C are almost identical, i.e. all the pages which are dynamically active in pattern B are also dynamically active in pattern C. However, note that there are intervening periods of time between the patterns, in which the access pattern is quite different. Therefore, some or all of the pages contained in the pattern A may be preempted to disk (in order to make room for incoming pages) before the point in time in which pattern set B is used. The way in which this preemption is carried out can have a serious impact on the system performance.

FIG. 2a can be thought of as an idealized representation of a portion of one of the patterns shown in FIG. 3. Note that contiguous regions of the virtual address space are mapped to contiguous regions of the physical address space when pages are preempted to disk in a conventional virtual memory system. This causes the scattered, non-localized pattern of the hot spots to be carried over to the disk. FIG. 2b, on the other hand, is the case for the idealized representation of a portion of one of the working sets, in which the virtual memory system of a preferred embodiment is employed. In this case the hot spots are grouped together on the physical address space when preempted to disk. In the preferred embodiment the hot spots, or dynamically active pages, are grouped together in clusters on the disk. At the future point in time when working set B is desired, the entire working set of hot spots can be faulted to RAM with just one or a few cluster faults. Contrast this to prior art systems in which each dynamically active spot of the pattern would have to be faulted into RAM separately by virtue of the scattered pattern of the addresses.

The example shown in FIG. 3 is not meant to define or delimit the scope of how the preferred embodiments can adapt to patterns of memory usage. Rather the example is simply one way in which the selective grouping of pages into clusters, as in a preferred embodiment, improves system performance.

Translation Function

A fundamental aspect of any virtual memory system is the process by which the virtual address is translated to the physical address, and the physical address is translated to the virtual address. It is this process by which the virtual memory system knows what page to fault into RAM in response to a virtual address reference by the processor, and also where on disk to place a page which has been preempted from the virtual memory. The process actually entails two separate functions.

The translation from virtual address to physical address can be represented as a V→P function. It is desirable to have the V→P yield a valid physical address as quickly as possible in order to avoid a possible performance bottleneck. There are a wide variety of implementations of the V→P function known in the art. Typically the V→P function is implemented as a series of look-up tables.

In a common V→P technique known in the art, the first order implementation of the V→P function is a very high speed associative memory called a translation look aside buffer (TLB). This structure contains the physical address of those pages in RAM which have been most recently referenced by the processor. The TLB contains the address for only a very few pages, which is required for quick execution; however, the page addresses contained within it, having been recently referenced, have a high probability of being referenced again.

If the TLB is not able to resolve the virtual address to a physical address contained within its index, a main memory based structure will be consulted. Typically this structure will be one of a series of look-up tables, either direct-mapped tables, or hash tables, or a tree structure. When the main memory based table is able to resolve the virtual address to a physical address located in RAM the TLB is updated to reflect this new translation and processing will continue. When the virtual to physical translation results in a physical address located on the disk, a page fault is generated as detailed in the above discussion.

A different type of translation function, known as the P→V function, is required when pages are to be preempted from main memory, as detailed above. When a page is selected for preemption, its physical address in RAM is known. The P→V tables translate this address to the virtual address currently associated with that location in order to properly track the page in the subsequent preemption operations.

Disk Bandwidth

Disk bandwidth, the amount of data transferred from or to the disk per unit of time, is a significant factor in overall system performance. If disk bandwidth is low the processor must repeatedly wait for needed information to be loaded to RAM. Therefore it is desirable to maximize disk bandwidth.

The bandwidth of a storage device is defined as the amount of information which can be transferred per unit of time, usually expressed as K-bytes per second (KB/s). For example, the case of a system in which page size is four K-bytes, the following paging time applies:

| | |
|---|---|
| AVERAGE ACCESS DELAY | 16 ms |
| AVERAGE ROTATIONAL DELAY | 8 ms |
| TIME TO TRANSFER 4KB OF DATA | 4 ms |
| TOTAL | 28 ms |

As shown, only fourteen percent (4 ms/28 ms) of the total paging time is spent in actually transferring data. The bandwidth of this system 4 KB/28 ms or 143 KB/s.

Raw disk bandwidth is improved with pre-paging schemes. For instance, if the above system pre-paged four adjacent pages with each faulted page, the following paging time would apply:

| | |
|---|---|
| AVERAGE ACCESS DELAY | 16 ms |
| AVERAGE ROTATIONAL DELAY | 8 ms |
| TIME TO TRANSFER 20K-BYTES OF DATA (5 PAGES) | 20 ms |
| TOTAL | 44 ms |

In this case forty-five percent of total paging time is spent actually transferring data, leading to a raw disk bandwidth of 454 KB/s. This appears to be a great improvement, and shows why pre-paging is frequently used.

However, the extra prepages only improve the system performance if they are used. Since the pages which can be accessed by prepaging represent pages which are contiguous on the virtual address space the probability of using the prepages is dependent on the spatial locality of reference in the access pattern. Often this form of locality is quite low. In a later section we show that the measured average number of prepages used is 0.6 for a specific test case. We also show that the best that one can reasonably expect is 1 useful prepage per page fault with typical access patterns. Since raw disk bandwidth does not directly effect system performance we define EFFECTIVE DISK BANDWIDTH as Kb used per second. In other words, RAW DISK BANDWIDTH is the amount of information transferred per second, whereas EFFECTIVE DISK BANDWIDTH is the amount of useful information transferred per second. In the example above, if the average number of prepages used is 1 then the EFFECTIVE DISK BANDWIDTH is 182 KB/SEC. This is a real improvement over the 143 KB/SEC obtained without prepaging, but much less than the raw disk bandwidth associated with prepaging.

A second issue involved is predicated on the assumption that all of the data in a page is useful data. As noted above, a page is a grouping of words, and although it is convenient to transfer and organize the memory in units of pages, the processor actually references the memory in units of words within the pages. For any given page transferred to RAM, only some of the words within that page truly represent useful data, i.e. data that the processor will actually utilize. The rest of the words in the page are simply loaded in by default, as the page is the atomic unit of transfer. The concept of the amount of useful data per page versus total data per page is called packing density. Packing density is a crucial factor in the effectiveness of utilization of the system RAM.

Packing density is significant because of internal fragmentation in computer memory data storage. For instance, in a typical application, the memory content is composed of a very large number of very small objects. A typical object size is about thirty bytes. Typical pages sizes range from 512 bytes to 8K-bytes. Consider the system discussed above, which uses 4K-byte page sizes. To load a desired object into main memory, would require 4K-bytes of scarce RAM. Were dynamically active objects localized to certain regions of the address space, packing density would not be a problem, as these localized regions would exhibit good packing. However, the dynamically active objects are generally scattered over the entire address space, leading to severe internal fragmentation, and hence, poor packing density.

Moving to a smaller page size would seem to alleviate the problems caused by the internal fragmentation of dynamically active objects, and in fact, smaller pages do indeed provide much greater system performance in terms of RAM utilization and packing density as is shown in a later section. However, conventional memory systems cannot yield any real performance improvement with small pages because of the way in which pages are transferred to and from RAM on a per page basis. Conventional memory systems transfer one page to RAM on a demand basis each time a page is faulted, with the addition of whatever pages might be prepaged in anticipation of future demand. However, the bandwidth of the auxiliary memory storage device is proportional to page size. The formula for bandwidth is:

PAGE SIZE/(ACCESS DELAY+ROTATIONAL DELAY+TRANSFER TIME)

The first two terms of the denominator are constant with respect to page size, and the third term, which is dependent upon page size, is a second order term with respect to the overall value of the denominator for small pages. Therefore, for all intents and purposes, the denominator can be considered relatively constant with page size, and hence the bandwidth will drop off with decreasing page size.

Therefore, attempts to improve the packing density factor of effective RAM utilization run afoul of the bandwidth constraint of conventional memory systems. These two opposing forces tend to offset each other such that the gain in internal fragmentation loss from small pages is offset by a loss in effective disk bandwidth such that to a first order term the overall performance of a conventional paging system is reasonably invariant with page size.

The present invention ameliorates the inherent inefficiencies of conventional virtual memory systems by the ability to detect which pages are in fact dynamically active, independent of their location on the virtual address space, and to store these pages as groups in contiguous locations on the storage device. This makes it possible to retrieve them as groups with high effective disk bandwidth when they are needed in the future. Because pages are transferred to and from RAM as groups, independent of page size, small pages can be used in order to improve packing density without a subsequent loss of disk bandwidth. The invention further adapts for changes in the pattern of frequently referenced pages as it is actively grouping and storing pages at all times during the preemption procedures.

DESCRIPTION OF THE PREFERRED EMBODIMENTS

Memory Organization

Figure 1:
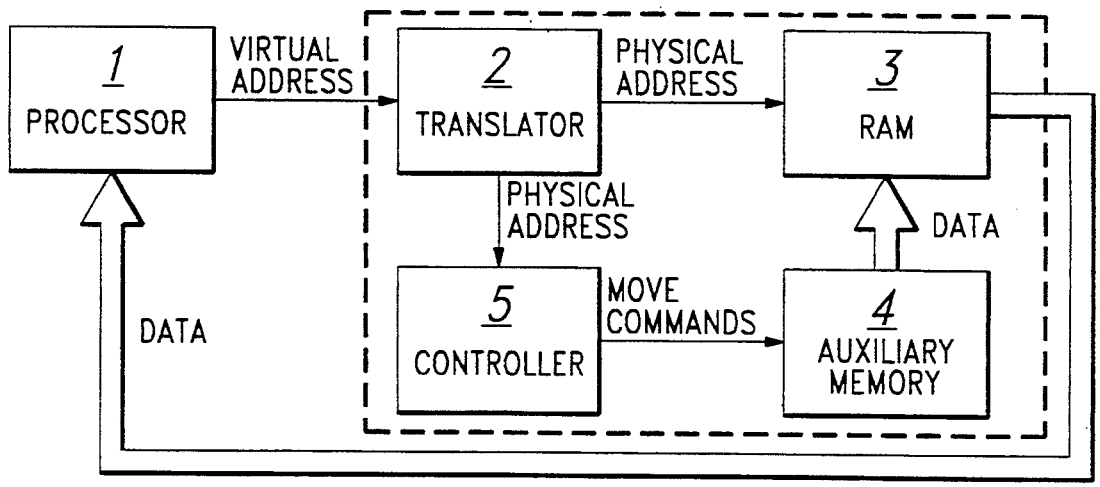
FIG. 1: A schematic diagram of a virtual memory system
Figure 2A:
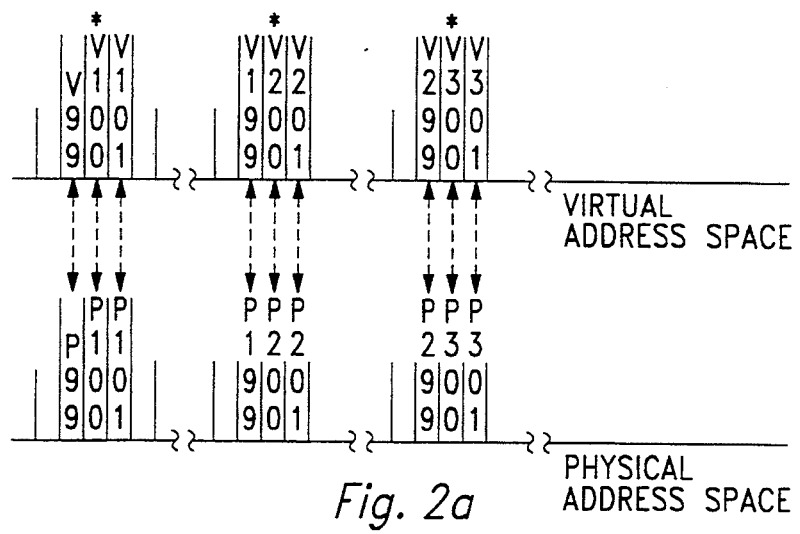
FIGS. 2a–b: Schematic diagrams of idealized portions of virtual and physical address space.
Figure 2B:
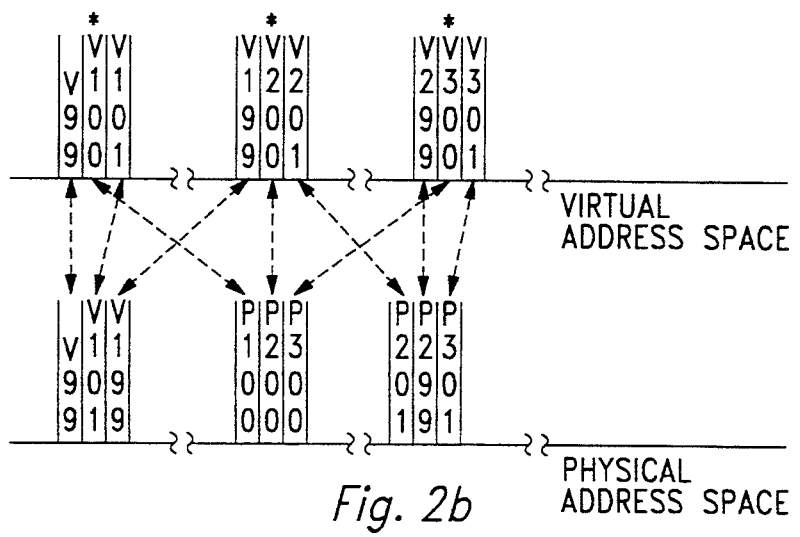
Figure 3:
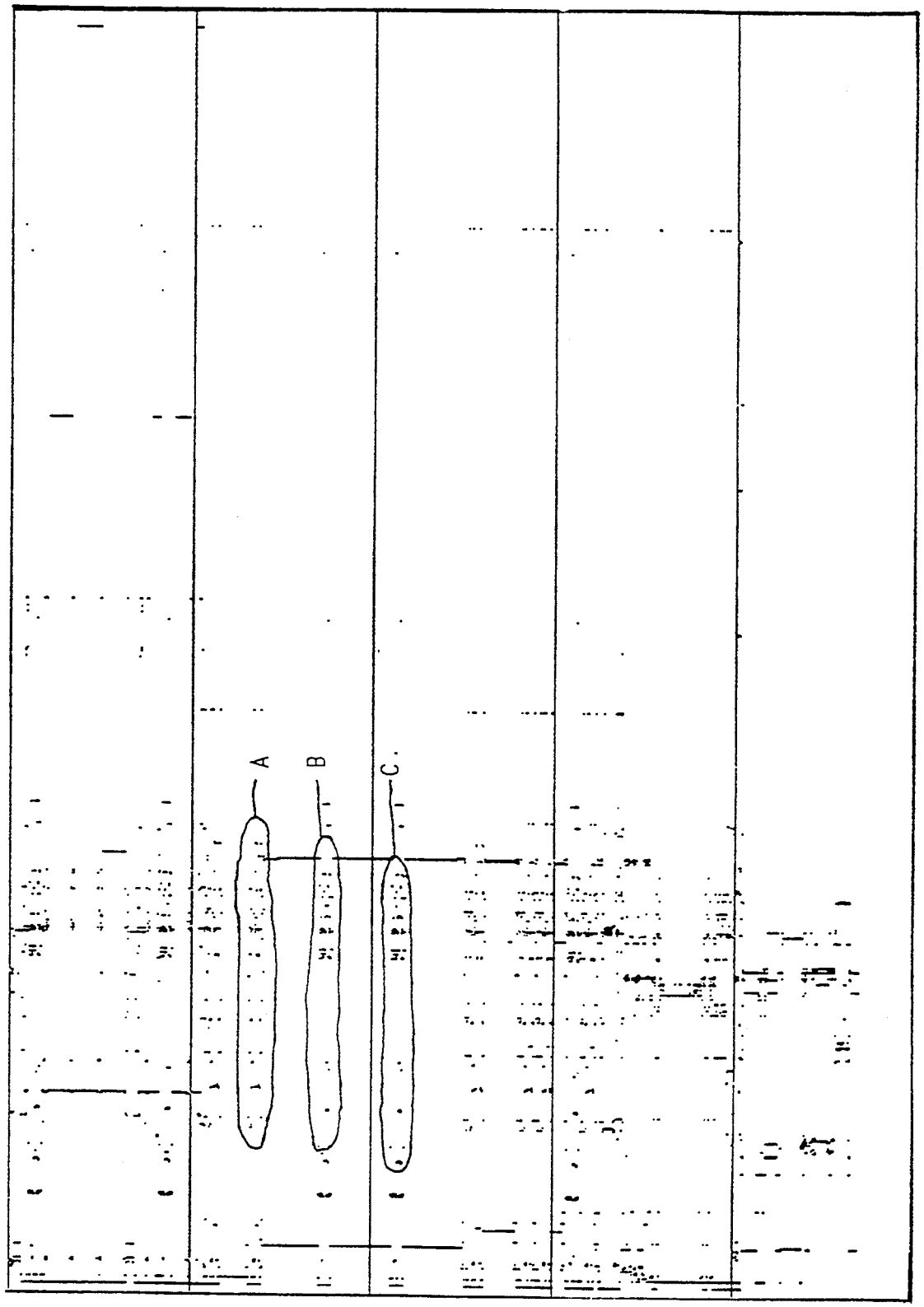
FIG. 3: Trace diagram showing typical memory address usage.

A first preferred embodiment memory management system operates in an object-oriented, symbolic language system with a single 128 Megabyte virtual address space and an eight megabyte RAM. System memory is divided into pages of two K-bytes each, resulting in sixty-four K virtual pages. The pages on disk are grouped into clusters of thirty-two K-bytes each. Each cluster contains fifteen pages and a cluster header. The cluster header contains status and location information for each page contained within the cluster (as will be detailed infra) so the pages in a cluster need not be contiguous in the virtual address space.

Page Fault

In a conventional memory system a page fault results when a processor-generated address resolves to an address located on disk. When this occurs, the page is faulted into RAM, and processing continues. Some conventional systems utilize pre-paging in order to load a few extra pages into RAM along with the faulted page in order to increase disk bandwidth somewhat.

In the first preferred embodiment, a page fault results in the entire thirty-two K-byte cluster of fifteen pages and cluster header being loaded into RAM in a single long transfer. A thirty-two K-BYTE transfer quantum will result in very high disk bandwidth. Perhaps more importantly, by selectively and discriminatively grouping together those pages to form a cluster which have previously exhibited a sequential time sequence of first usage (first usage refers to the instance when the page is first referenced by the processor, subsequent to its fault into RAM), and by loading this entire cluster in one long transfer, the probability of a given page in a cluster being referenced at or about the same time as the faulted page is very high. Because of this attribute the EFFECTIVE DISK BANDWIDTH is also quite high in addition to the raw disk bandwidth. The entire system performance will be positively impacted. This leads to not only high disk bandwidth, but also high effective utilization of system RAM.

When the V→P translation results in an address on disk, the virtual memory system selects fifteen unallocated pages in RAM and transfers the entire cluster including the header to RAM. A single page in RAM is reserved at all times to hold the header information so there is no need to dynamically allocate and release a page for the header information.

Unlike conventional virtual memory systems in which contiguous regions of the physical address space are statically mapped onto contiguous regions of the virtual address space, the information in the cluster header describes where the fifteen pages of the cluster are located on the virtual address space. In this way the selected pages do not have to be contiguous on the virtual address space in the present invention. Therefore the pages of the cluster faults into RAM may be dispersed to various locations throughout the virtual address space.

After the cluster has been transferred to RAM each cluster header entry is processed. There are three possible results of this processing:

1. Each cluster header entry has a status bit which indicates that the associated page is either a fill page or a valid page. If the header entry indicates that the page is a fill page then the associated RAM page is released to the free page pool and processing proceeds to the next header entry.

2. If the cluster header entry status bit indicates a valid page then the information in the cluster header entry is used to access the RAM based V→P table. If the V→P table entry does not indicate that the page is located on disk and in the cluster faulted in then the associated page of the cluster is really a stale copy of a page which has faulted into RAM at an earlier time. In this case the associated RAM page is released to the free page pool and processing proceeds to the next header entry.

3. If the cluster header entry status bit indicates a valid page and the V→P table indicates that the page is located on disk in the cluster which has faulted in then the associated RAM page is a valid faultin page and the following processing steps are executed:

3.1 The P→V table entry of the associated RAM page is changed to show PREPAGE status and to reflect the virtual page number of the page which has faulted in. The cluster number that the PREPAGE came from is saved in the P→V table.

3.2 The RAM page is added to the front of a doubly linked circular list of pages in PREPAGE status. A doubly linked circular list is one in which every item in the list is linked to the item previous and subsequent to it on the list. The links to maintain this list are part of the P→V table data structure. All pages in PREPAGE status reside on this doubly linked list which is ordered by time of faultin.

3.3 The V→P table is changed to show PREPAGE status and to give the RAM location of the page as the physical address rather than the disk based cluster number.

After all of the pages of the faultin cluster have been processed the page fault processor is exited. At this time all of the valid pages of the cluster (including the one which caused the page fault) have been placed in PREPAGE status. When pages are in PREPAGE status an attempt to reference the page will cause a PREPAGE access fault. When we exit the page fault processor we know that one PREPAGE access fault will occur immediately for the page which caused the cluster faultin. Other PREPAGE access faults may occur later for the other pages of the cluster. When a PREPAGE access fault occurs the following processing sequence will be executed.

Prepage Access Fault Processing Sequence

1. The referenced PREPAGE is removed from the circular PREPAGE list and added to the front of a circular doubly linked list of ACTIVE pages. All ACTIVE pages reside on the doubly linked list of ACTIVE pages which is ordered by time of first reference. Since PREPAGE status is mutually exclusive with ACTIVE status the same data structure in the P→V table is used to maintain the links.

2. The page status in both the V→P and the P→V tables is changed from PREPAGE to NORMAL. (Here NORMAL indicates that the reference bit is set.)

3. The count of the number of pages located in the cluster which supplied the PREPAGE is decremented by one. We maintain a count at all times of the number of pages logically located in each cluster on disk. A cluster with a count of 0 is a free cluster which may be assigned for new preempt clusters. The act of faulting a cluster into memory does NOT logically remove the faultin pages from the disk based cluster. Indeed pages in PREPAGE status have two addresses, the current address in RAM and the cluster address on disk. The act of referencing a PREPAGE and causing it to be converted to NORMAL status does logically remove the page from the faultin cluster so the count is decremented at this time.

Preempt

All pages in RAM will be in one of four states, FREE, NORMAL, AGE, or PREPAGE. FREE status indicates that the page is in the FREE page pool and is available for immediate use. NORMAL status indicates a page that is very dynamically active, i.e. one that has been referenced by the processor very recently. AGE status indicates a page which was previously referenced by the processor at some time during its occupancy in main memory (RAM). When a page is in AGE status a count is maintained to indicate the number of cycles of the clock algorithm since the page has been referenced. Hence, an AGE page with a count of 0 is one that was in NORMAL status previously, but is no longer dynamically active. A PREPAGE page is one that has not been dynamically active, that is, it has not been referenced at all during its residency in main memory (RAM).

When the system needs to allocate a new page, either to support a cluster faultin or to populate a region of newly created virtual address space, it first tries to satisfy the request with a page in the FREE page pool. If the FREE page pool is empty the number of pages in PREPAGE status is compared to a threshold and if the number is larger than a threshold value then the PREPAGE which has been in memory the longest is preempted. The steps to effect preemption of a PREPAGE are:

Prepage Preempt Sequence:

1. Remove the page from the PREPAGE list and decrement a counter of the number of PREPAGES.

2. Restore the disk based cluster address to the V→P table. NOTE: The disk based cluster address is saved in the P→V data structure for pages in PREPAGE status.

3. Release the page to the FREE page pool.

NOTE: The preemption of unused PREPAGES does not require any disk I/O activity and the location of an unused PREPAGE on disk remains unchanged. This is in contrast to the preemption of an ACTIVE page as described below. The preemption of an ACTIVE page always requires a cluster write operation and the pages in the new cluster all receive a new disk address when they are preempted.

Preemption of ACTIVE pages normally is triggered when the system detects that the number of FREE and the number of PREPAGE pages are below a threshold VALUE. When this occurs the system will form a preempt cluster and start a preempt write to disk. We can overlap continued execution with the time to complete the preempt disk write unless the pool of FREE pages is exhausted or we encounter a need to access the disk to service another request such as a page fault or a file system I/O request. These preempt writes are called background writes.

As in the page fault routine, preemption is done on a cluster basis. Therefore, preemption involves selecting a set of fifteen pages for preemption, locating a contiguous region of unallocated space on disk large enough to hold the cluster (thirty-two K-bytes), creating a cluster header, transferring the fifteen pages and cluster header to the disk in one long transfer, and finally, updating the V→P and P→V tables.

Contrary to the prior arty a contiguous region of the virtual address space is not mapped to a contiguous region of the physical address space during preemption. In the preferred embodiment, pages are selected from throughout the virtual address space based on their activity status and their order of first use. By selectively and discriminatively grouping pages together in nearly the same order as their order of first use to form a preempt cluster the system can take advantage of patterns in memory usage, and can adapt for changes in these patterns over time. In the previous art, these patterns of memory usage caused the problems of low packing density and loss of disk bandwidth as discussed previously. By dynamically and adaptively forming clusters in the present embodiment, these shortcomings are overcome.

Pages are selected for preemption on the basis of their activity status and their order of first use.

The circular list of ACTIVE pages provides the data structure to remember the order of first use. As noted above pages are added to the front of this list when they are first actively referenced. Hence, at any time the list provides information about which pages have first use times which are close to each other.

Clearly it is also necessary to detect which pages have not been referenced for a long time so that we can select working sets which have gone inactive for preemption. As noted above, a count is maintained for each page in AGE status. Using this count field the pages can be ranked as to activity as:

NORMAL>AGE31>AGE30>. . . AGE2->AGE1>AGE0.

The activity grade of a page is increased to the NORMAL level any time the page is referenced by the executing program. The activity grade of pages are decreased in a systematic way by a clock process which rotates on the circular list of ACTIVE pages.

We can regard this activity grading scheme as an approximation to a least recently used, LRU, stack with 33 levels. NORMAL is the most active top of the LRU stack and AGE0 is the most inactive bottom of the LRU stack.

NOTE: Some pages may be "wired" to prohibit preemption. These pages are simply NORMAL pages which are exempt from page aging by the circular clock process.

It is possible, and useful to have different aging rates for different pages. Three aging rates are supported in the first preferred embodiment controlled by a 2 bit aging gain code in the P→V table. Initially, when a page is added to the active list the gain code is set for high speed aging in which the age count is decreased by 4 each time it is changed by the clock rotator. i.e.

NORMAL→AGE28→AGE24→. . . AGE4→AGE0

If a page with high speed aging has aged down to an age count in the lower half, I.E. less than AGE16, and the page is referenced then the gain code is adjusted to medium speed aging in which the age count is decreased by 2 each time it is changed by the clock rotator. i.e.

NORMAL→AGE30→AGE28→. . . AGE2→AGE0

If a page with medium speed aging has aged down to the lower half and the page is referenced then the gain code is adjusted to slow speed aging in which the age count is decreased by 1 each time it is changed by the clock rotator. i.e.

NORMAL→AGE31→AGE30→. . . AGE1→AGE0

When invoked the clock rotator processes pages decreasing the age counts as controlled by the age gain code until 12.5% of the pages are in AGE0 status. The pages with AGE0 status are regarded as inactive working sets available for preemption. The clock rotator is always invoked prior to forming a preempt cluster. It is also invoked at other times when the system is momentarily idle to maintaining balance during periods when preemption is not active. This prevents a large number of pages faulting to normal status, and maintain this status for a long period of time simply because the clock has not been triggered for a long period of time because there has been no need for preempton.

Some typical numbers may help clarify this situation.

Suppose that we have 8 MB of RAM and a 2 KB page size. Then we have 4096 pages total. But not all of the pages are in the dynamic paging pool. Some pages are used for overhead functions such as the V→P table, the P→V table, portions of the system root that is wired in RAM, the pool of PREPAGES, etc. After allowing for these overheads we typically may have 3600 pages in the dynamic paging pool. These 3600 pages will be activity graded by the LRU stack approximation to yield about 450 pages with AGE0 status. There are 15 pages in a cluster so in this case the size of the AGE0 pool is about 30 times the size of a single preempt cluster. Whenever we need to form a preempt cluster the pages selected will always come from the AGE0 pool. It is important that the AGE0 pool be large relative to the cluster size and measurements on the first working model indicate that the performance improvement increases substantially as this ratio improves.

As noted above, pages are selected for preemption on the basis of their activity status and their order of first use. Selecting pages for preemption from the pool of AGE0 pages satisfies the activity status portion of this criteria. The second criteria is satisfied using the list of ACTIVE pages as described below.

As noted above, the pages on the ACTIVE page list are ordered by time of first use. We use a second rotating preempt clock pointer to control the start point for a search procedure to identify 15 pages, which all have AGE0 status, and form a coherent group with closely spaced time of first use. Starting at the current location of the preempt clock pointer we sequentially examine pages moving from pages with an old time of first use toward pages with a more recent time of first use. For each sequential set of 15 pages with AGE0 status we determine a count of the number of embedded gaps, where a gap is one or more pages which do not have AGE0 status. This gap count is used as a coherencey metric. The lower the gap count, the better the coherencey. A group with a gap count of zero is a perfect set with no embedded gaps. This search procedure continues until:

1. A group with a gap count of 0 is located.
or
2. A group with a gap count less than 3 is encountered and it is terminated by a gap.
or
3. The search encounters an AGE0 page with the stale flag set as described below.
or
4. The complete ACTIVE list has been examined, i.e. the search has cycled back to the start point.

If the search is terminated by conditions 1 or 2 above then a coherent cluster group has been located and this group is selected for preemption. If the search is terminated by 3 above then a coherent cluster group has not been found but a stale page which must be preempted has been located. In this case the set of 15 AGE0 pages starting with the stale page are selected. Termination of the search by step 4 is a somewhat pathological situation which does not usually occur. If this condition does occur then the sequence with the smallest gap count is selected.

In any case any AGE0 pages located between the current location of the preempt clock pointer (where the search procedure started) and the first page selected for preemption are marked as stale pages using a bit in the P→V table. Also the preempt pointer is advanced to point just after the last page selected for preemption.

The selection process described above strikes a balance between two issues which must be addressed. On the one hand, we would like to find and select very coherent clusters with a small number of gaps. Selection criteria 1 and 2 address this desire. On the other hand some isolated, very inactive pages will occur and these pages must be removed from RAM in some reasonably timely fashion whether they are part of a coherent cluster or not. Selection criteria 3 addresses this desire.

With the selection procedure described above pages which are part of a coherent cluster will be selected and preempted the first time they are examined by the rotating preemption clock. On the other hand pages which are not part of a coherent preempt cluster (at this time) are exempt from preemption on the first pass of the rotating preemption clock. However, these pages are marked as stale pages which guarantees that they will be preempted on the next cycle of the preempt clock if they are still in AGE0 status. In general three things can happen to a stale page during the delay cycle following the exemption on the first pass of the rotating preemption clock.

1. Other pages near the stale page on the ACTIVE list may be converted to AGE0 in which case the stale page may be part of a coherent cluster when it is selected for preemption on the second pass. In this case the choice to delay is a net win.

2. The stale page may be used and faulted back to a NORMAL status. In this case the choice to delay is a net win since a page fault was avoided.

3. The stale page may still be an isolated inactive page which is not part of a coherent cluster. In this case the delay has done no good so we would grade this situation as a net loss. However, as noted above, the preemption procedure must deal with inactive isolated pages in some reasonably timely fashion and this does satisfy that requirement.

NOTE: In all cases the set of 15 pages selected occur sequentially on the ACTIVE list (perhaps with gaps) and the ACTIVE list is ordered by time of first use.

Figure 4:
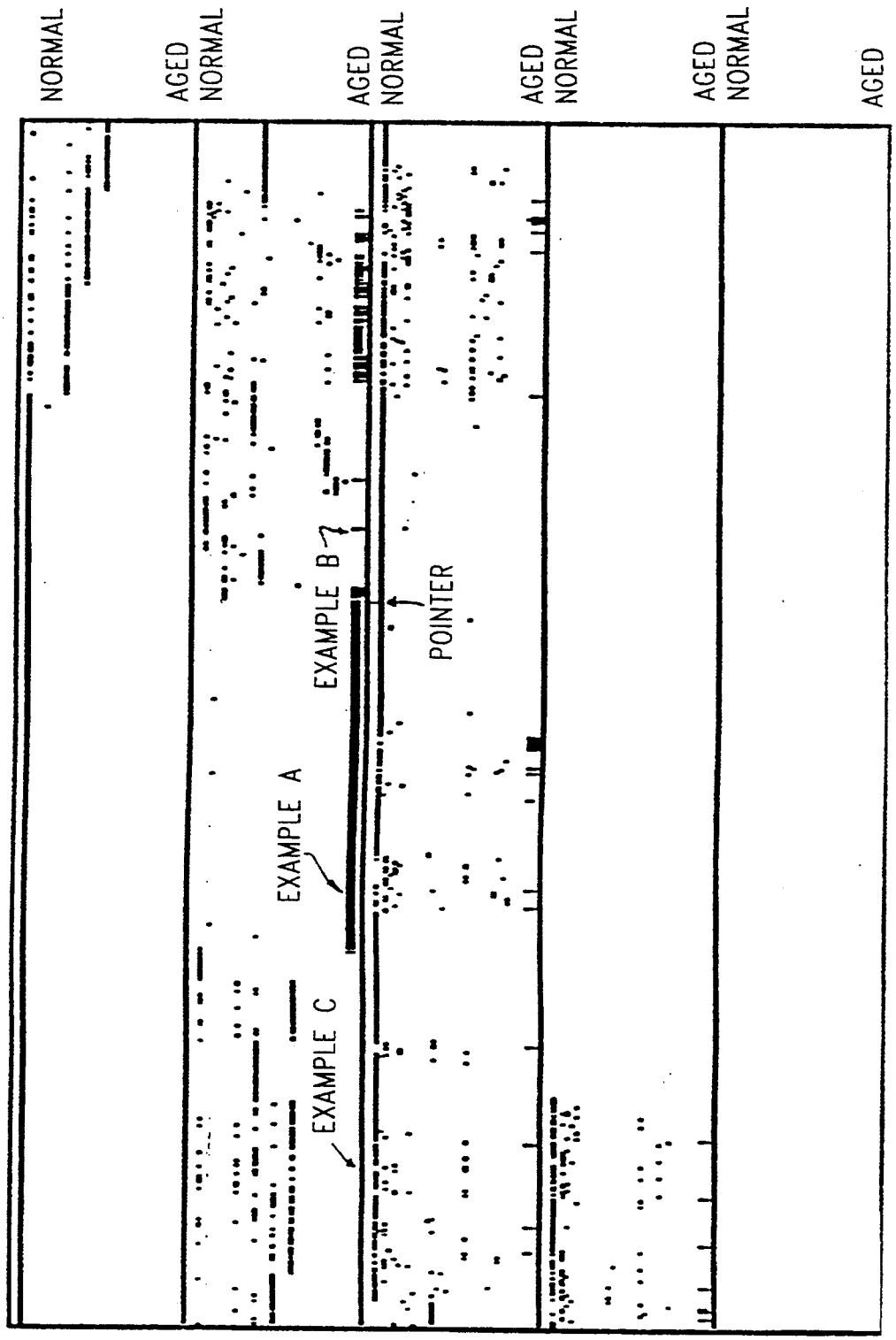
FIG. 4: Graphical display of ACTIVE pages list.

A graphical display of the ACTIVE list, split into five rows and stacked, is shown in FIG. 4. In this Figure each horizontal axis represents position on the ACTIVE list moving from most recent first use in the upper left to oldest first use at the lower right. The vertical displacement (within a ROW) indicates the current activity status of the page with NORMAL at the top and AGE0 at the bottom. The AGE0 pages without the stale flag set are shown with a double wide mark (note example A in the Figure) and the AGE0 pages with the stale flag set are shown with a triple wide mark (note example B in the Figure). The regularly spaced small white marks in the baseline indicate the size of a 15 page cluster for reference (note example C in the Figure). The current location of the rotating preempt pointer is shown by a small line marker below the baseline (labelled as pointer). The rotating preempt pointer will move to the left as pages are grouped into preempt clusters.

Several interesting points are worth note in FIG. 4. First note that the current position of the rotating preempt pointer is directly in front of a very coherent section of AGE0 pages. Since these pages are shown with double width the stale flag is not set indicating that these pages have become AGE0 pages during the current cycle of the preempt pointer. Since they are coherent (don't have gaps) they will be selected for preemption when space requirements call for preemption. Second note the isolated incoherent pages on the third and fourth row of FIG. 4. These pages were deferred when the preempt pointer passed them and the stale flag is set as indicated by the triple width display. However, these pages will be preempted on the next cycle of the preempt pointer without regard for coherence unless they are referenced and faulted back to a NORMAL status. Finally note the group of AGE0 pages near the right of the second row. Here we have a mixture of triple width incoherent pages which were AGE0 when the preempt pointer passed them and other double width pages which have become AGE0 pages since the preempt pointer has passed them. On the next cycle the clusters formed will have better coherence with the new AGE0 pages than would have been possible earlier.

After the fifteen pages to form the cluster have been identified, an available cluster is allocated on disk, and a cluster header is formed containing the virtual address of each page within the cluster. The pages are then written to disk in a single transfer, and the V→P tables are modified to show the cluster location as the physical address for all of the pages in the cluster, after which the RAM pages previously occupied by the fifteen pages are released to the FREE page pool.

Translation Function

The V→P translation function is performed by a direct mapped table which contains sixty-four K entries, one for every two K-byte page of the 128M byte virtual address space. Each entry provides the physical address associated with the virtual address of the page, and the status of the physical page, organized as follows:

Bits 0–20: provide the physical page location for pages in RAM, or the physical cluster location in which the page will be found, for pages on disk.

Bits 21–24: provide the status of the page, i.e. RAM or disk resident and NORMAL, AGE, or PREPAGE status for RAM resident pages.

Bits 25–31: these bits can be used as flags for other operating system support.

The virtual address which will be input to the V→P table is a twenty-five bit word consisting of two parts. The leftmost sixteen bits are the virtual page address. These sixteen bits can distinguish two to the sixteenth power (i.e. sixty-four K) distinct pages within the virtual memory. As each page contains five hundred twelve words (of four bytes each), the rightmost nine bits are used to distinguish the location of the words to be addressed within the page. The leftmost sixteen bits of the virtual address are referred to as the virtual page address, and the rightmost nine bits are referred to as the virtual word address.

The relative location of a word within a page is unchanging whether in RAM or on disk. Therefore, the virtual word address does not need to be translated from a virtual to physical address or vice versa. Rather, only the first sixteen bits of the virtual address, which make up the virtual page address, need be used as an index to the V→P table.

If the V→P table resolves the virtual page address to a physical address in RAM, the resulting 32 bit physical address is composed using the 21 bit physical page number from the V→P table, the 9 bit virtual word address and 2 bits of 0 because the physical address uses a byte oriented format rather than a word oriented format. The resulting 32 bit address exactly defines the word address in RAM by the page in which it is contained, and its relative position within the page. The contents of the address are then referenced, and processing continues.

If the V→P table resolves the virtual page address to a physical address on disk, the 21 bit entry in the table will define the location on disk, of the cluster in which the page is located. This will result in a cluster fault routine being initiated to load the cluster into RAM. As described above, a cluster fault results in fifteen pages and the cluster header being loaded into RAM. The cluster header contains the virtual page address of the pages within the cluster. As the fifteen pages are loaded into available unallocated pages within RAM, their new physical locations are stored in the appropriate entry of the V→P table. When the V→P entries have been updated to show the RAM address, the nine bit virtual word address can be concatenated to the 21 bit physical page address. Again, the resulting 32 bit address exactly defines the word address in RAM by the page in which it is contained, and its relative position within the page. The contents of the address are then referenced, and processing continues. The translation from a page's physical address to the virtual address associated with it, is required when selecting pages for preemption. In the first preferred embodiment, the P→V function is also performed by a direct mapped table, which contain one entry for each page in the physical address space. Each entry contains the virtual address associated with the physical page, as well as the status and counter fields discusses previously.

For pages in RAM, each P→V table entry is organized as follows:

WORD 1
Bits 0–15: provide the virtual address associated with the page
Bits 16–20: age counter value of the page as set by clock algorithm
Bits 21–22: aging gain code, 0→fast, 2→medium, 3→slow
Bits 23—23: stale flag
Bits 24–26: Page-status. This field indicates the following possible conditions of the page:
FREE Page is FREE and available for use
NORMAL Page is in NORMAL status
AGE Page is in AGE status
PREPAGE Page is in PREPAGE status
Bits 27–31: Spare bits not used.

WORD 2
Bits 0–15: Next link of a doubly linked list.
Bits 16–31: Previous link of a doubly linked list.

WORD 3
Saved disk cluster number for pages in PREPAGE status.

For pages on disk, the P→V table entries are located in the cluster headers. Each cluster header will contain the P→V entries for the pages located within that cluster, organized as follows:

Bits 0–15: Virtual address associated with the physical address
Bits 16–22: Spare bits not used.
Bits 23–25: Page status. This field indicates the following possible conditions of the page:
FREE Page not used. FREE entries in a cluster are rare. They are used to fill out a cluster in the event that there are not enough pages of the correct type available at the time of preemption.
OTHER This status indicates the page has been defined on the virtual address space.
Bits 26–31: Spare bits not used.

Advantages

In the first preferred embodiment, using a large disk transfer quantum results in greatly increased raw disk bandwidth. Furthermore, by grouping pages selectively into clusters, the probability of a page in RAM being referenced is increased leading to increased EFFECTIVE DISK BANDWIDTH.

Disk Space Allocation And Reclamation

As noted above the unit of allocation of disk space for paging store is a 32 KB cluster. This allocation mechanism is implemented using a byte table indexed by cluster number. Each entry in the byte table contains a count of the number of pages logically located in the cluster. An entry with a 0 count is a free cluster available for allocation.

When a new cluster is formed a free cluster is located and used. At this time the byte count is changed from 0 to the number of pages located in the new cluster. (Usually 15 indicating a full cluster.) As pages are faulted back into memory and used the byte count for the cluster is reduced as noted above. Note that pages are only really used when they are referenced and moved from the prepage list to the active list. Prepages which are not used retain the same disk address and do not cause the count to be decremented.

From time to time portions of the address space are reclaimed and placed back in a pool of available virtual address space as a result of the actions taken by the system's process, e.g. the Explorer garbage collector. This action also causes the byte count for clusters which contain reclaimed virtual pages to be decremented.

The actions described above may result in byte counters decrementing to 0 and when this occurs the associated disk cluster is immediately reusable. However, it is also possible in the course of normal operation to develop a sizable number of clusters with counts greater than 0 but less than 15. When this occurs we have an internal fragmentation loss of disk storage and it may be necessary to perform a packing operation to reclaim this disk space. Fortunately, this is an easy problem to solve as described below.

When we have clusters with counts greater than 0 but less than 15 this indicates that some of the pages originally located in the cluster have faulted into memory and are currently either located in RAM or have migrated to another disk location in a subsequent preempt. The pages which remain in the original disk cluster have not been used but they are still correlated with each other and it is still likely that if one of the pages is used in the future then several will be used in the future. For this reason we want any repacking procedure to preserve the existing grouping of pages into clusters.

Suppose we have one cluster with 7 pages and another cluster with 8 pages. Clearly it is possible to combine the two clusters into one cluster without adversely impacting the page groupings. Extending this line of reasoning there is a set of 2 to 1 mappings that have this attribute. I.E. 1-14, 2-13, 3-12, etc. There are also a set of 3 to 1 mappings that also preserve the attribute i.e. 5-5-5, 6-4-5, etc. With this in mind we can implement a background deamon which performs no action until paging store is detected to cross some full threshold such as 80% full. When the threshold has been exceeded it will begin packing clusters on disk as outlined above making necessary adjustments to the V→P map.

Performance Measurements

The first preferred embodiment adoptive page placement, APP, paging system has been implemented on the Explorer II and some standard performance measurement benchmarks have been used to measure the performance of APP. The benchmark test consists of a software instrumented system which drives the entire system through a script of interactive usage. Since the script is stored on a file it is possible to obtain an exactly repeatable test under changing hardware and software conditions and measure the impact of the change on system performance.

Three software systems were measured.

System 1—The Release 6.0 version of the Explorer Operating System. This system uses conventional paging with a 2 KB page size. It supports both prepaging and multiple page preempt write. This system is used as the baseline system for the normalized graphs which follow.

System 2—The APP system as described above with a 2 KB page size.

System 3—The APP system as described above with a 1 KB page size. In this case the cluster size is still 32 KB however a cluster holds 31 1 KB pages and header rather than 15 2 KB pages and header.

The first 2 systems were measured using RAM sizes of 8 MB, 10 MB, and 12 MB. System 3 was measured using RAM sizes of 8 MB and 10 MB. (System 3 does not page in a 12 MB RAM so this is not an interesting quantitative measurement.)

The hardware used was an Explorer II system with a disk having average access time of 16 ms, average rotational latency of 8 ms, and formatted data transfer rate of 1.5 MB/SEC. NOTE: The transfer rate of this disk is 1.5× faster than the 1 MB transfer rate used in the model calculations.

The results of these measurements are shown in Table 1 below. NOTE: The unit of measure for all times is seconds. The PAGES USED and MB USED reflect the number of pages faulted into RAM from disk and subsequently referenced. PREPAGES which are not used are not included in these numbers. The EFFECTIVE DISK BANDWIDTH has a unit of measure of KB/SEC and only the pages faulted in and used are included in the calculation of EFFECTIVE DISK BANDWIDTH.

TABLE 1

|  | 8MB | 10MB | 12MB |
|---|---|---|---|
| RELEASE 6.0 | | | |
| PAGE WAIT TIME | 517 | 323 | 198 |
| FILE I/O TIME | 69 | 63 | 59 |
| CPU TIME | 484 | 469 | 451 |
| TOTAL TIME | 1,070 | 855 | 708 |
| PAGES USED | 28,050 | 18,639 | 12,035 |
| MB USED | 56.1 | 37.3 | 24.1 |
| EFFECTIVE DISK BANDWIDTH | 109 | 115 | 122 |
| PAGES USED PER READ OPERATION | 1.6 | 1.6 | 1.6 |
| APP - 2KB PAGE SIZE | | | |
| PAGE WAIT TIME | 210 | 71 | 30 |
| FILE I/O TIME | 50 | 46 | 41 |
| CPU TIME | 484 | 471 | 451 |
| TOTAL TIME | 744 | 588 | 522 |
| PAGES USED | 23,277 | 13,430 | 7,099 |
| MB USED | 46.6 | 26.9 | 14.2 |
| EFFECTIVE DISK BANDWIDTH | 222 | 379 | 473 |
| PAGES USED PER READ OPERATION | 4.6 | 7.6 | 9.6 |
| APP - 1KB PAGE SIZE | | | |
| PAGE WAIT TIME | 80 | 25 | |
| FILE I/O TIME | 44 | 43 | |
| CPU TIME | 478 | 472 | |
| TOTAL TIME | 602 | 540 | |
| PAGES USED | 24,179 | 13,643 | |
| MB USED | 24.2 | 13.6 | |
| EFFECTIVE DISK BANDWIDTH | 303 | 544 | |
| PAGES USED PER READ OPERATION | 11.6 | 19.6 | |

Figure 5:
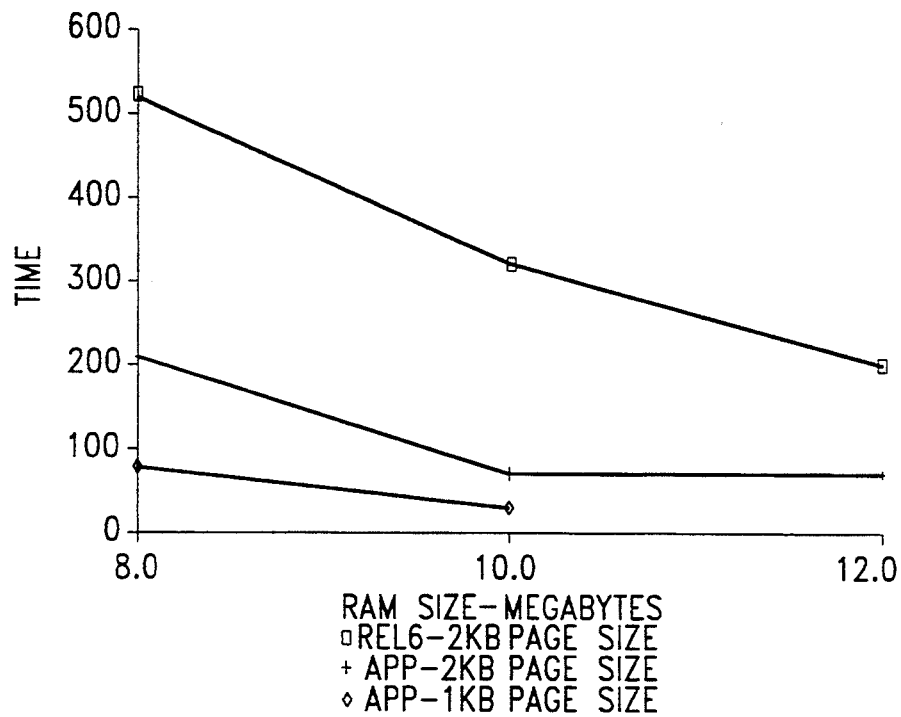
FIG. 5: Graphical representation of page wait time versus RAM size.
Figure 6:
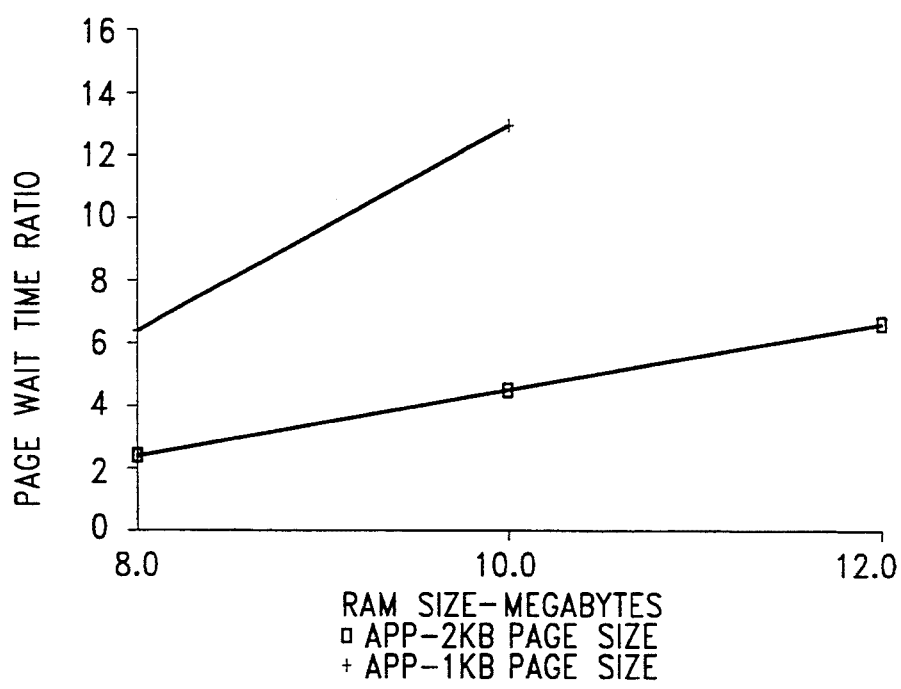
FIG. 6: Graphical representation of page wait time ratio versus RAM size.

The page wait time for the three systems is shown in graphical form in FIG. 5. The ratio of page wait time for System 1 divided by the page wait time of each of the APP systems is shown in FIG. 6. With a 2 KB page size the APP system is yielding a 2.5× improvement in page wait time at 8 MB and a 6.6× improvement at 12 MB. When a 1 KB page size is used the improvement in page wait time is 6.5× at 8 MB and 12.9× at 10 MB. Clearly the APP system performance is improved with smaller page sizes. This issue is addressed in more depth in the next Section. The significant positive slope to the gain versus RAM size curves is due to the sensitivity of the APP cluster formation process to the RAM size/cluster size ratio as noted above.

The page wait time is the ratio of the volume of information faulted in and used divided by the EFFECTIVE DISK BANDWIDTH, where only pages used are included in the EFFECTIVE DISK BANDWIDTH. The system performance can be improved either by decreasing the volume which needs to be faulted in from disk, or increasing the EFFECTIVE DISK BANDWIDTH.

Figure 7:
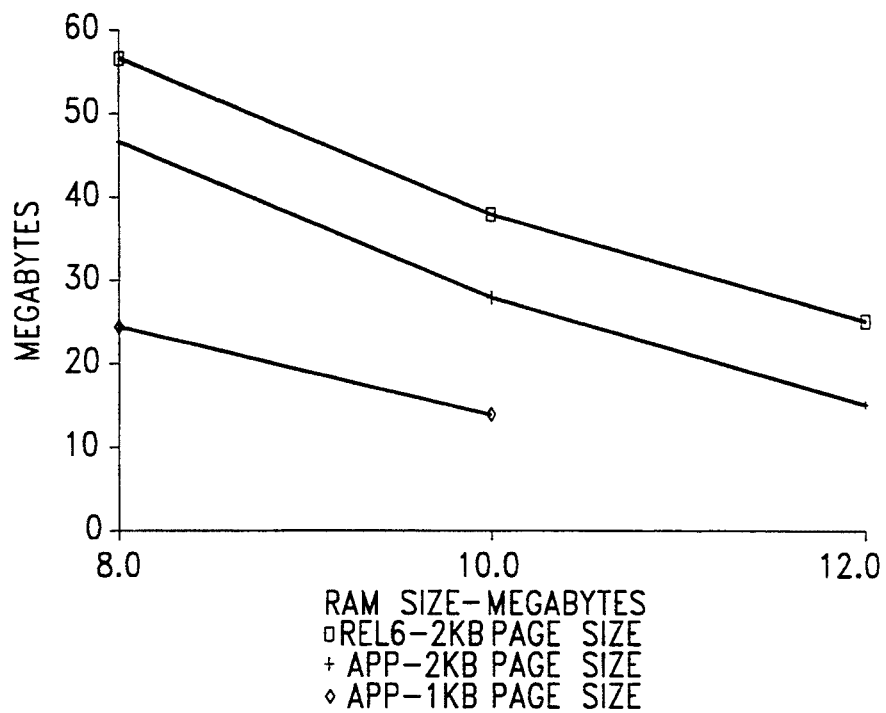
FIG. 7: Graphical representation of disk fault in volume versus RAM size.
Figure 8:
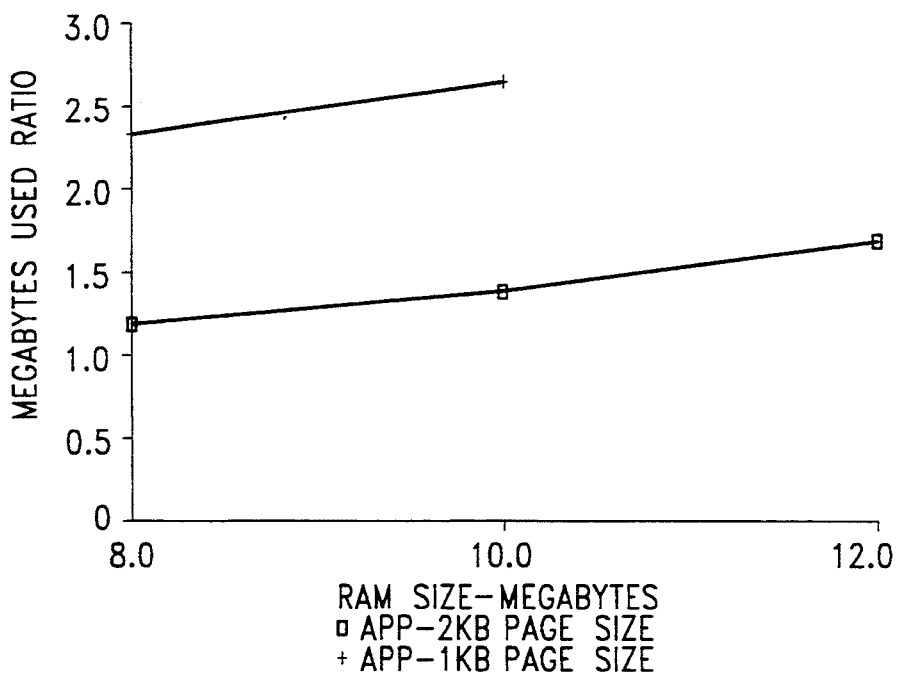
FIG. 8: Graphical representation of disk fault in volume ratio versus RAM size.

The volume, MB USED, for the three systems is shown in graphical form in FIG. 7. The ratio of MB USED for System 1 divided by MB used for each of the APP systems is shown in FIG. 8. With a 2 KB page size the APP system is yielding a 1.2× improvement in MB USED at 8 MB and a 1.7× improvement at 12 MB. This improvement is believed to be due to the ability to use coherencey in addition to activity level in the page preemption policy as described above. When a 1 KB page size is used the improvement in MB USED is 2.3× at 8 MB and 2.7× at 10 MB.

If we compare the MB USED for APP at 2 KB page size to the MB USED at 1 KB page size we see that the factor of 2 shift in page size generates almost exactly a factor of 2 reduction in MB USED. This is due to the reduction in internal fragmentation loss discussed above. This issue will be discussed in more depth in the next Section.

Figure 9:
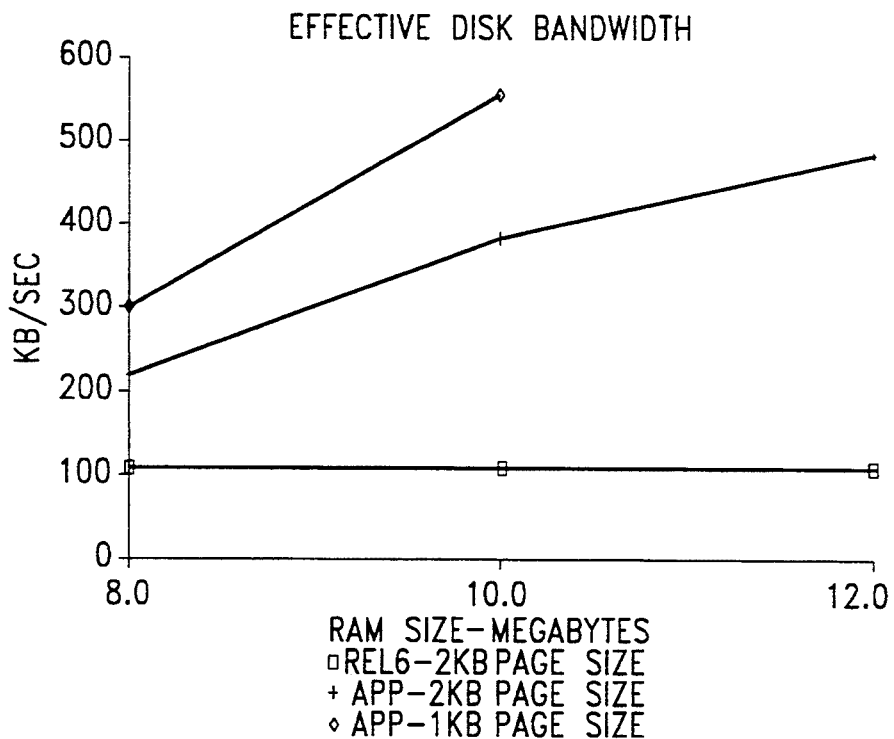
FIG. 9: Graphical representation of EFFECTIVE DISK BANDWIDTH versus RAM size.
Figure 10:
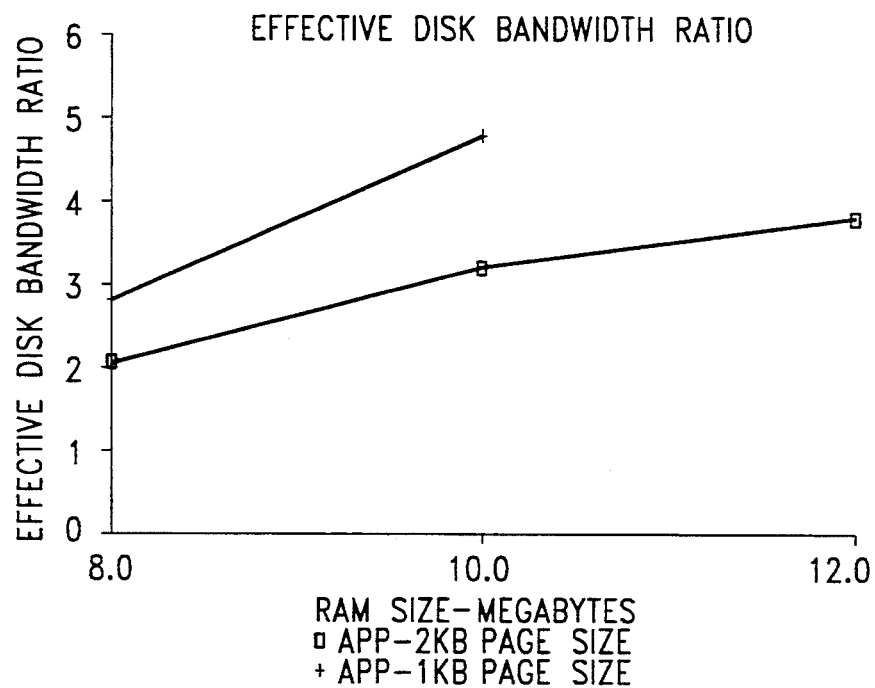
FIG. 10: Graphical representation of normalized EFFECTIVE DISK BANDWIDTH versus RAM size.

The EFFECTIVE DISK BANDWIDTH, MB USED divided by page wait time, for the three systems is shown in graphical form in FIG. 9. The ratio of the EFFECTIVE DISK BANDWIDTH for each of the APP systems divided by the EFFECTIVE DISK BANDWIDTH of System 1 is shown in FIG. 10. From FIG. 9 we can see that the EFFECTIVE DISK BANDWIDTH for conventional paging increases slightly with increasing RAM size and has a value slightly above 100 KB/SEC. On the other hand the EFFECTIVE DISK BANDWIDTH for the APP system is much higher and increases substantially with RAM size. With a 2 KB page size the APP system is yielding a 2.0× improvement in EFFECTIVE DISK BANDWIDTH at 8 MB and a 3.9× improvement at 12 MB. When a 1 KB page size is used the improvement in EFFECTIVE DISK BANDWIDTH is 2.8× at 8 MB and 4.7× at 10 MB. This gain is achieved by obtaining a much larger value of pages used per read operation with APP than is possible with conventional paging. The data in Table 1 shows the pages used per read operation is 1.6 for System 1 with conventional paging. Since the fault page is always used this value indicates that the average number of prepages used is only 0.6. On the other hand the number of pages used for the APP system with a 2 KB page size varies from 4.6 at 8 MB to 9.6 at 12 MB. The average number of prepages used is therefore 3.6 to 8.6. This is a substantial improvement over conventional prepaging.

We have seen above that the use of a small page size substantially improves the performance of the APP system. It is interesting to consider what would the impact of a 1 KB page size be on the conventional paging System 1. We do not have measured data on this system. However, the net impact can be forecast. First, we would expect that the use of a 1 KB page size would reduce the MB USED by a factor of 2 just as it does for the APP system. However, with conventional paging, the use of a 1 KB page size would also reduce the EFFECTIVE DISK BANDWIDTH by a factor of 2 since the total time of a disk transfer is dominated by access time and twice as many disk transfers would be required to access a given volume. Since the page wait time is the ratio of MB USED divided by EFFECTIVE DISK BANDWIDTH there would be no change in page wait time. This first order model explains why we see such wide variations in the page size used in current computer systems with no apparent real performance difference. For example DEC VAX computers use a 512 byte page size and SUN workstations use a 8 KB page size. Indeed, since the use of small page size does not generate a performance improvement and the use of small pages does increase the required hardware it makes sense to use a rather large page size in the context of conventional paging.

The picture is quite different in the context of APP paging. Here we can enjoy the reduction in MB USED available with small pages WITHOUT incurring a reduction in EFFECTIVE DISK BANDWIDTH. Indeed the EFFECTIVE DISK BANDWIDTH increases with small page size. The hardware configuration used for the first embodiment is not optimum as will be shown in the next Section.

SECOND PREFERRED EMBODIMENT

A second preferred embodiment memory management system operates in a UNIX environment system. This type of system is configured as a multi-user, multi-task system. Virtual address space is allocated and de-allocated on a by-need basis, and hence the size of the virtual address for each user is not a constant. Also the UNIX system supports a plurality of address spaces rather than the single fixed size address space of the Explorer.

The Page Fault, Translation, and Preemption policies are implemented generally as described in the first preferred embodiment. It should be noted that the variable size and plurality of address spaces favors the use of a multilevel RAM based tree structure for the V→P translation rather than the direct mapped V→P function used in the first preferred embodiment. These translation procedures are well known and the only impact of the APP system on these functions is to require the ability to use small pages. This requirement is satisfied by some existing hardware mapping functions, such as the Motorala 68030 microprocessor, and not by others such as the SPARC Reference MMU. In any case the impact of the APP system on the V→P function is only to introduce a requirement for the use of small pages and the technology for implementation of V→P functions with small pages is already well known.

The Impact Of Page Size On Ram Size Required To Hold A Working Set

The packing density of useful information is very low for known systems, and the prior art teaches away from small pages because of bandwidth constraints. In the present invention, the disk bandwidth constraint is removed by the page-size-independent atomic unit of transfer, i.e. the cluster. Recall the formula for known systems disk bandwidth, as repeated below:

BANDWIDTH=PAGE SIZE/(ACCESS DELAY+ROTATIONAL DELAY+TRANSFER TIME)

In the preferred embodiment, all transfers to or from disk are done by cluster and, hence bandwidth is a function of cluster size as follows:

BANDWIDTH=CLUSTER SIZE/(ACCESS DELAY+ROTATIONAL DELAY+TRANSFER TIME)

Note that cluster size and transfer time are now constants with respect to page size, their value being dependent only upon whatever value for cluster size is chosen. In the present embodiment, a thirty-two K-byte cluster size was chosen, resulting in a very high disk bandwidth of 570 KB/s. (With a typical disk having a formatted transfer rate of 1 MB/s.)

With available disk bandwidth no longer dependent on page size, the page size can be chosen to provide the best possible system performance. To see how RAM size required varies with page size, trace data was analyzed using a standard benchmark program to evaluate the impact of page size on RAM size required to hold the entire benchmark working set. The results were standardized to the amount of RAM needed for the application when eight K-byte pages were used. The results are presented in tabular form below:

| Page Size | Normalized RAM Size | Gain Over Previous (L) |
|---|---|---|
| 8KB | 1.00 | — |
| 4KB | 0.79 | 1.26 |
| 2KB | 0.59 | 1.34 |
| 1KB | 0.44 | 1.34 |
| 512B | 0.32 | 1.36 |
| 256B | 0.23 | 1.39 |
| 128B | 0.17 | 1.32 |
| 64B | 0.14 | 1.29 |

Two aspects of the data are significant. Firstly, a factor of two decrease in page size does not result in a factor of two decrease in the amount of RAM required to hold a working set. This is because, the active addresses are not uniformly and sparsely spread out throughout the address space. To illustrate this point, two extreme cases are considered. Firstly, consider a system with large pages in which each large page in the working set contained one and only one active word. If the page size for such a system were cut in half, the result would be twice as many pages, of half the size. However, only half of the smaller pages would contain active words, and hence be required for the working set. Therefore, the working set could be covered with the same number of small pages as with the original large page resulting in a required RAM size which is half the size of the original. On the other extreme, if the original large pages were completely filled with active words, then cutting the page size in half would result in a system with twice as many pages, of half the size, all of which would be required to hold the working set. In this case, there would be no resulting decrease in the required RAM size. Typical systems are between these two extremes, with less than all, but more than half, of the smaller pages required to contain the working set, hence the reduction factor is greater than 1 but less than 2.

A second significant aspect of the data is that the change in RAM size required when going from a system with pages of size PS to a system with pages of size 2×PS is relatively constant across the range of page sizes which are typically used in virtual memory systems. This value, termed L, will be treated as a constant for the remainder of this discussion. From the data in the tables it can be seen that L is an essentially constant value of approximately 1.3.

Calculation Of The Average Working Set Spot Size

The measurements described above indicate that the L factor is reasonably constant, with a value about 1.3 over a wide range of page sizes. We saw earlier that the typical access pattern consists of memory references to "hotspots" which are scattered over the virtual address space. It turns out that it is possible to calculate the average working set spot size as a function of L as shown below. Further, since L is constant over a wide range of page sizes the average working set spot size, measured in number of pages, is also constant over a wide range of page sizes. This very counter intuitive result has some profound implications.

If a given page of size PS is in the working set, WS, let P be the probability that it's buddy page is also in WS. (The buddy page of a page is that page which could be combined with the page to form a correctly aligned page of size 2×PS.) Then if a page size of 2×PS were used the ratio of the RAM required with a page size of 2×PS to that required with a page size of PS is, $$L = \frac{2}{1 + P}$$

so $$P = \frac{2}{L} - 1$$

The probability of a WS segment being exactly i pages long is, $$P_i = i \times (1-P)^2 \times P^{(i-1)}$$

Since the expression above represents a normalized probability density function we can calculate the average WS segment length, A, by multiplying by i and summing over i. This $$A = (1 - P)^2 \times \sum_i i^2 \times P^{i-1}$$

The equations above have been evaluated for a range of L values and the results are shown in Table 2 below.

TABLE 2

| L | P | A |
|---|---|---|
| 1.05 | .905 | 19.97 |
| 1.10 | .818 | 10.00 |
| 1.15 | .739 | 6.65 |
| 1.20 | .667 | 4.99 |
| 1.25 | .600 | 3.99 |
| 1.30 | .538 | 3.33 |
| 1.35 | .481 | 2.85 |
| 1.40 | .429 | 2.50 |
| 1.45 | .379 | 2.22 |
| 1.50 | .333 | 2.00 |
| 1.55 | .290 | 1.82 |
| 1.60 | .250 | 1.67 |
| 1.65 | .212 | 1.54 |
| 1.70 | .176 | 1.43 |
| 1.75 | .143 | 1.33 |
| 1.80 | .111 | 1.25 |
| 1.85 | .081 | 1.18 |

We have seen from the trace date that an L value of about 1.3 is typical. When L is about 1.3 we see from Table 2 that the average working set spot size is about 3 pages. Also, since the L factor seems relatively constant over a wide range of page sizes the working set spot size is about 3 pages over a wide range of page sizes.

The L factor profile has been measured in two very different environments. The data shown in the previous section was actually measured using a Motorola 68020 processor executing a COBOL benchmark under the control of the UNIX operating system. We have made similar measurements using instrumented microcode on the Explorer system executing symbolic applications programmed in LISP. In both cases the L factor is about 1.3 and is reasonably constant over a wide range of page sizes. We have not made any measurements with "number crunching" applications and these may have a different profile. However, the data available would strongly suggest that the important statistics of the memory access patterns are not limited to symbolic applications and are very similar for two applications which would generally be considered to be quite different.

If the average working set spot size is about 3 pages then a fundamental bound is imposed on the maximum effectiveness of prepaging in a conventional paging system. Under the best of conditions it is not possible to obtain more than 2 useful prepages per page fault. Even achieving this would require faulting in a large number of prepages and holding them in RAM without preemption for a long time. When implementation pragmatics are considered it is not surprising that an average number of useful prepages around 1 is the best that one can expect with conventional prepaging. The measured value for the benchmark test described in the previous section is 0.6.

Calculation Of Optimum Page Size.

In the previous sections we have seen motivation for small page sizes to improve system performance with the APP paging system. It is reasonable to ask "How small is small and what is the optimum page size?". This question will be evaluated in the following section.

We start with a brief review of RAM usage. System RAM can be divided into two separate sections—the paging store, and the look-up tables. The definition of the latter section is obvious, it is the amount of RAM used by the tables of the V→P and P→V functions. The paging store is the remainder of the RAM which is available to hold pages of data. Both of these sections of RAM are functions of page size. For a given application, the working set will be of such a size to require a certain amount of RAM to hold it. This is termed the paging store needed (PSN). Recall that L is the ratio of paging store needed for a system with pages of size $2 \times PS$ to the paging store needed for a system with pages of size PS. The formula for this is, then:

$$L = \frac{PSN(2 \times PS)}{PSN(PS)} \quad (1)$$

We have seen above that L can be considered a constant over the range of page sizes of interest. In order for the above equation to be true, that is for the ratio of $PSN(2 \times PS)$ to $PSN(PS)$ to be equal to a constant, the PSN(PS) function must be of the form:

$$PSN(PS) = A \times PS^B \quad (2)$$

where A and B are constants

Equations 1 and 2 can be combined, and solved for B in terms of L as follows:

$$L = \frac{A \times 2^B \times PS^B}{A \times PS^B} \quad (3)$$

$$= 2^B$$

so $$B = \log(L) \quad (4)$$

Therefore, although B is an unknown, relevant values can be found from L. Recall from the table above that the L factor is typically 1.3 over a wide range of page sizes of practical interest. When the value of L is 1.3 the value of B is 0.3785.

EQ'N 2 can be differentiated with respect to PS to derive the following:

$$PSN'(PS) = \frac{B \times PSN(PS)}{PS} \quad (5)$$

One additional term needs to be defined in order to derive the formula for optimum page size, namely the paging store available (PSA). PSA is also a function of page size, and is the amount of system RAM available for paging store. PSA is the RAM size (RS) less the amount of RAM used by the P→V and V→P look-up tables.

The P→V look-up table, has one entry for each page of RAM. The size of an entry is generically referred to as entry cost EC1 and is typically about 12 bytes. Total table cost is equal to the entry cost times the RAM size (RS) divided by the page size (PS), as below:

$$\{P \to V\}_{cost} = EC1 \times \left(\frac{RS}{PS}\right) \quad (6)$$

Similarly the V→P table, has one entry for each page of the allocated virtual address space. (NOTE: In a UNIX environment the V→P table is really a multilevel tree structure. However, the large majority of the space needed to store the tree structure is consumed for the leaf elements of the tree and this allows the approximation that the V→P table has a size which is proportional to the allocated virtual address space.) The size of an entry is generically referred to as the entry cost EC2 and is typically about 4 bytes. The total RAM cost of this table is, therefore, the entry cost times the virtual address size (VA) divided by the page size (PS), as below:

NOTE: This derivation assumes that the V→P and P→V translate tables are located entirely in RAM at all times.

$$\{V \to P\}_{cost} = EC2 \times \left(\frac{VA}{PS}\right) \quad (7)$$

Finally, the paging store available (PSA) can be derived by substituting EQ'NS 6 and 7 into the equation below:

$$\begin{aligned} PSA(PS) &= RS - \{V \to P\}_{cost} - \{P \to V\}_{cost} \\ &= RS - \frac{EC1 \times RS}{PS} - \frac{EC2 \times VA}{PS} \\ &= RS \times \frac{\left\{PS - EC1 - \frac{EC2 \times VA}{RS}\right\}}{PS} \end{aligned} \quad (8)$$

EQ'n 8 can be differentiated with respect to PS to derive the following:

$$PSA'(PS) = RS \times \left(\frac{EC1 + \frac{EC2 \times VA}{RS}}{PS}\right) \quad (9)$$

The optimum page size can be calculated by setting PSN(PS)=PSA(PS) and PSN'(PS) =PSA'(PS), and solving for the optimum page size (PSO). The resulting equation is shown below:

$$PSO = \frac{\left(EC1 + \frac{EC2 \times VA}{RS}\right) \times (B + 1)}{B} \quad (10)$$

Figure 11:
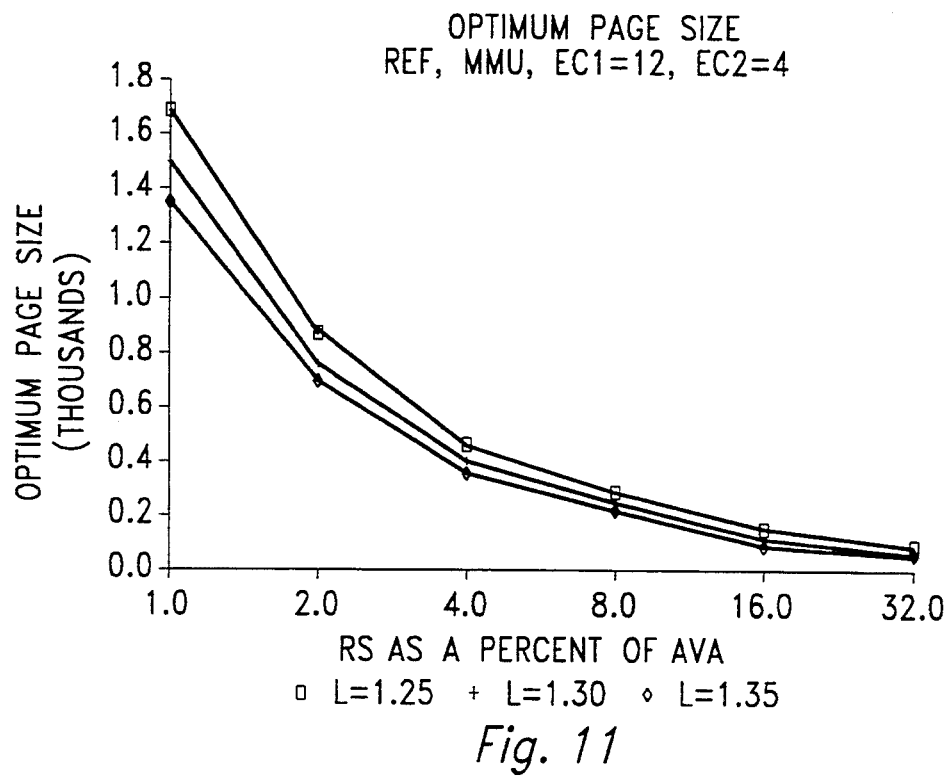
FIG. 11: Graphical representation of optimum page size versus RAM size (as percent of total virtual memory).

From EQ'N 10, we can see that optimum page size is dependent upon the RAM size to virtual address space ratio. It is useful to plot the value of optimum page size for various system configurations in which RAM size as a percentage of total virtual address space is varied, as in FIG. 11. Equation 10 is plotted for three values of L (from which the value of B is derived by Equation 4). Note that the value of optimum page size does not vary greatly with variance in the value of L. However, optimum page size is greatly influenced by changes in the percentage of virtual address space which is implemented as RAM.

Of course as noted above the total size of the virtual address space changes with time during the operation of a system so it is not practical to operate with the page size always exactly optimum. However, performance pragmatics impose a limit on the RAM size to virtual address space ratio of a real configured system. In practice this ratio is usually not smaller than 30% for paging performance reasons using conventional paging. With the APP paging system this operating point will shift to a slightly lower value. However, one would not expect acceptable performance with this ratio below about 8%. At this operating point a page size of 256 bytes is the optimum page size. Also note that even when the actual operating point has a larger RAM size to virtual address percent a 256 byte page is no more than a factor of 2 from optimum and this deviation is shown to have a small impact below.

The optimum size for the P→V and V→P tables (TSO) can be calculated by considering the case when the optimum page size (PSO) is utilized with an optimum RAM size (RSO). In such a case:

$$TSO = RSO \times \left\{ \frac{EC1 + \frac{EC2 \times VA}{RSO}}{PSO} \right\}$$

$$TSO = RSO \times \frac{B}{B+1}$$

Therefore, $$\frac{TSO}{RSO} = \frac{B}{(B+1)} \quad (11)$$

It can be seen by Equation 11 that the percent of RAM which should be reserved for the tables is only a function of B, and hence L. The following table shows values for TSO for L values of interest:

| L | B | Percent RAM for Tables |
|---|---|---|
| 1.25 | 0.322 | 24.35% |
| 1.30 | 0.379 | 27.48% |
| 1.35 | 0.433 | 30.22% |

Having determined an optimum page size, it is revealing to determine how RAM size is impacted when some page size other than the optimum page size is used. To do so, define a factor F as the ratio of a given page size PS to the optimum page size PSO, whereby:

$$F = \frac{PS}{PSO} \quad (12)$$

The paging store needed PSN was shown above to be a function of page size, and the ratio of PSN for a given page size to that of an optimum page size is:

$$\frac{PSN(PS)}{PSN(PSO)} = \frac{A \times PS^B}{A \times PSO^B}$$

$$= \frac{PS^B}{PSO^B}$$

$$= F^B$$

Therefore, $$PSN(PS) = PSN(PSO) \times F^B \quad (13)$$

It was shown above that the RAM look-up table size (TS), is inversely proportional to the page size. Therefore, this function of page size can be expressed as the inverse to the page size:

$$\frac{TS(PS)}{TS(PSO)} = \frac{1}{F} \quad (14)$$

Therefore, $$TS(PS) = \frac{TS(PSO)}{F}$$

$$= \frac{RSO \times B}{F \times (B+1)} \quad (15)$$

Since we are no longer using the optimum page size, a larger RAM size (RS) will be required. This RS is equal to the value of PSN(PS) which is the paging store needed for the non-optimal page size, plus TS(PS) which is the table size needed for the non-optimal page size:

$$RS(PS) = PSN(PS) + TS(PS)$$

$$= RSO \times \left(\frac{F^B + \frac{B}{F}}{B+1}\right)$$

Therefore, $$\frac{RS(PS)}{RS(PSO)} = \frac{F^B + \frac{B}{F}}{B+1} \quad (16)$$

Figure 12:
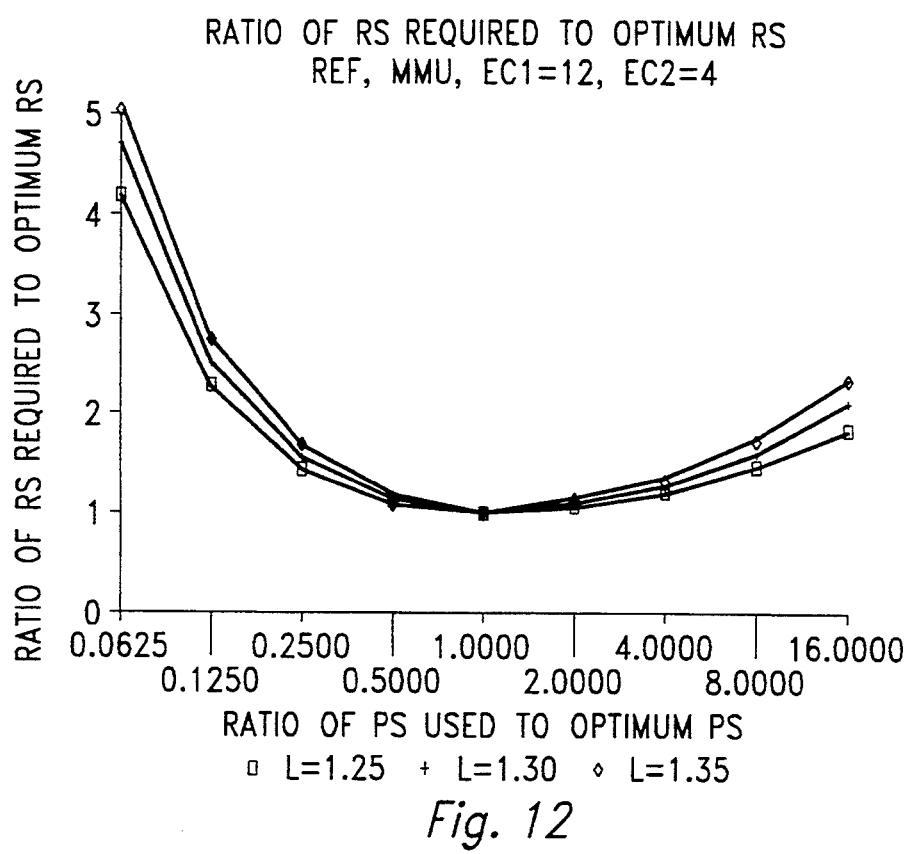
FIG. 12: Graphical representation of RAM size required versus ratio of page size to optimum page size.

The results of Equation 15 have been plotted in FIG. 12 for three values of L. Again, variation in the value of L results in little variation of the plot. However, the ratio of the RAM size to the optimal RAM size, is widely variant with page size. From the plot it can be seen that going from a page size of two K-bytes to a page size of 256 bytes—a factor of eight—results in approximately a 1.5 reduction in RAM size required. In the case of a system with four K-byte pages going to 256 byte pages—a factor of sixteen—the amount of RAM required would be cut approximately in half.

Clearly, then, a significant savings in system cost can result in using smaller pages in conjunction with the present invention, which allows for a smaller RAM to hold the working set.

On the other hand we can see from FIG. 12 that the use of a 256 byte page size when the optimum might be 128 bytes will have only a small adverse effect.

The Gain Of Using Multiple Spindle Disks

The discussion above has assumed the use of a single channel to the disk subsystem. In large systems the APP paging system offers a viable path to use the increased disk bandwidth available from parallel data transfers to multiple disk spindles (or multiple read/write channels to a single spindle.)

A great deal of effort has been dedicated to lowering the rotational delay times, and access delay times to their present levels, and further reduction in these parameters seems unlikely to be significant in the future. Having optimized the read/write operations, disk drive manufacturers have needed to explore alternative methods for increasing bandwidth. Multiple spindle disk subsystems are one method which is finding widespread and growing acceptance.

The concept of multiple spindles is to provide multiple read/write heads which access multiple disks, in order to have a plurality of concurrent data transfers active. However, very little benefit is gained from a multiple disk system with conventional paging systems, because disk transfers are only performed on a per page demand basis. On the other hand, the present invention can make full use of multiple spindles by virtue of the fact that the quantum of disk transfer, the cluster size, can be chosen independent of page size.

Because of this, it is a simple process to take full advantage of the disk capability by transferring to or from disk in a compound cluster, i.e. one cluster for each spindle, all transferred in parallel.

The current cluster size of 32 KB was chosen to match the parameters of a single modern disk. From the performance measurement data we saw that the effectiveness of the APP system increases with increasing RAM size. This is believed to be due to the RAM size to cluster size ratio. This gain curve must approach an asymptote as the best that one can ever do is to form perfect preempt clusters which will subsequently generate a 100% use rate on faultin. From the data available, the gain of APP should reach it's asymptotic value with RAM size somewhere in the 16 MB to 32 MB range with a 32 KB cluster size. This covers a large percent of the applications which are common today.

However, from observing the history of computer usage it is easy to see that applications in the future will continue to grow substantially just as they have in the past. As we deal with working sets which require 32, 64, 128, 258, . . . MB of RAM the effective disk bandwidth must scale with the RAM size. Conventional paging systems face an impasse in this regard. For these larger systems the APP system can provide effective disk bandwidth which scales with RAM size as shown in the table below.

| RAM SIZE | CLUSTER SIZE | NUMBER OF DISK CHANNELS |
| --- | --- | --- |
| 0 → 32MB | 32KB | 1 |
| 32 → 64MB | 64KB | 2 |
| 64 → 96MB | 96KB | 3 |
| ... | ... | ... |

Modifications and Advantages

The preferred embodiments improve system performance by grouping pages for preemption into clusters on the basis of their use. Additionally, the preferred embodiments establish an optimum page size on the basis of RAM size. However, several variations and modifications to the described embodiments are possible while preserving these features.

Among the possible modifications are different RAM size and/or different auxiliary memory size. Other modifications include a different cluster size with a different number of pages and/or a different auxiliary memory medium (for instance an optical disc system). Further, an alternate aging scheme could be employed (for instance, all pages could be counted down from NORMAL status to AGE0 status at the same rate). Additionally, an alternative gap count coherency metric could be used when selecting clusters of AGE0 pages for preemption. Additionally, alternate schemes for organizing the translation function information could be employed (for instance tree structures, faulting tables,).

What is claimed is:

1. A memory system, comprising:
   a central processor;
   an address translator coupled to said central processor;
   a main memory coupled to said translator;
   an auxiliary memory coupled to said translator; and
   a memory manager for selecting pages of data on the basis of frequent reference by said processor, independent of page location on a virtual address space, and transferring said selected pages in groups from said main memory to contiguous regions of said auxiliary memory.

2. The memory system of claim 1, wherein said pages are selected for preemption on the basis of their order of first reference and subsequent frequency of reference by said processor.

3. The memory system of claim 1, wherein each group is a cluster comprising at least one page and a cluster header containing the status and location information for each page contained within the cluster.

4. The memory system of claim 3, wherein the data forming one of said clusters which is transferred to said auxiliary memory in a single transfer will be transferred to said main memory in a single transfer.

5. A method of memory management in a memory system, comprising the steps of:
   selecting pages in a main memory based upon their order of first reference and subsequent frequency of reference by a processor;
   grouping a predetermined number of frequently selected pages into a cluster;
   transferring said cluster to a contiguous region of an auxiliary memory; and
   transferring said cluster from said contiguous region of said auxiliary memory to said main memory responsive to reference, by said processor, to one of said selected pages in said cluster.

6. The method of claim 5, wherein said first reference refers to the instance when a page is first referenced by the processor, subsequent to its fault into main memory.

7. The method of claim 5, further including time of last reference of said pages as a factor in selecting said pages in said main memory.

* * * * *